United States Patent
Yan et al.

(10) Patent No.: US 10,903,956 B2
(45) Date of Patent: Jan. 26, 2021

(54) UPLINK DATA TRANSMISSION METHOD AND RELATED DEVICE

(71) Applicant: Huawei Technologies Co., Ltd., Guangdong (CN)

(72) Inventors: Zhiyu Yan, Shenzhen (CN); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/054,315

(22) Filed: Aug. 3, 2018

(65) Prior Publication Data

US 2018/0343090 A1 Nov. 29, 2018

Related U.S. Application Data

(63) Continuation of application No. PCT/CN2016/073568, filed on Feb. 4, 2016.

(51) Int. Cl.
*H04L 5/00* (2006.01)
*H04L 27/00* (2006.01)
(Continued)

(52) U.S. Cl.
CPC ............. *H04L 5/005* (2013.01); *H04L 5/001* (2013.01); *H04L 5/0044* (2013.01); *H04L 5/0051* (2013.01); *H04L 5/0062* (2013.01); *H04L 5/0073* (2013.01); *H04L 5/0092* (2013.01); *H04L 5/0094* (2013.01);
(Continued)

(58) Field of Classification Search
None
See application file for complete search history.

(56) References Cited

U.S. PATENT DOCUMENTS

2012/0039273 A1\* 2/2012 Nam ............... H04L 5/0005
370/329
2014/0016475 A1\* 1/2014 Zhou ............... H04W 72/1242
370/236
(Continued)

FOREIGN PATENT DOCUMENTS

CN 101977099 A 2/2011
CN 102378271 A 3/2012
(Continued)

OTHER PUBLICATIONS

Office Action issued in Japanese Application No. 2018-541127 dated May 18, 2020, 5 pages (with English translation).
(Continued)

*Primary Examiner* — Ayaz R Sheikh
*Assistant Examiner* — Sori A Aga
(74) *Attorney, Agent, or Firm* — Fish & Richardson P.C.

(57) ABSTRACT

A terminal (e.g. user equipment (UE)) receives signal sending indication information that is sent by an access network device for an uplink subframe, where the signal sending indication information is used to instruct the terminal to send a sounding reference signal SRS in a first symbol of the uplink subframe, and/or used to instruct the terminal to send a PUSCH in a symbol that is included in a second symbol set of the uplink subframe. The terminal sends an SRS and/or a PUSCH in the uplink subframe based on the signal sending indication information.

9 Claims, 13 Drawing Sheets

(51) Int. Cl.
*H04L 12/413* (2006.01)
*H04L 25/02* (2006.01)
*H04W 16/14* (2009.01)
*H04W 72/04* (2009.01)

(52) U.S. Cl.
CPC ........ *H04L 12/413* (2013.01); *H04L 25/0226* (2013.01); *H04L 27/0006* (2013.01); *H04W 16/14* (2013.01); *H04W 72/0413* (2013.01); *H04W 72/0446* (2013.01); *H04L 5/0053* (2013.01)

(56) References Cited

U.S. PATENT DOCUMENTS

| | | | |
|---|---|---|---|
| 2015/0078222 A1* | 3/2015 | Yang | H04L 5/0092 370/280 |
| 2015/0237626 A1* | 8/2015 | Li | H04L 5/14 370/280 |
| 2015/0358826 A1 | 12/2015 | Wei et al. | |
| 2015/0373675 A1 | 12/2015 | Seo et al. | |
| 2016/0014701 A1 | 1/2016 | Nam et al. | |
| 2017/0086214 A1 | 3/2017 | Kalhan et al. | |
| 2017/0171856 A1* | 6/2017 | Zeng | H04L 27/2613 |
| 2017/0195889 A1 | 7/2017 | Takeda et al. | |

FOREIGN PATENT DOCUMENTS

| | | | | |
|---|---|---|---|---|
| CN | 102685707 A | 9/2012 | | |
| CN | 103096346 A | 5/2013 | | |
| CN | 10331244 A | 9/2013 | | |
| CN | 105210434 A | 12/2015 | | |
| JP | 2017517983 A | 6/2017 | | |
| KR | 20130106817 A | 9/2013 | | |
| WO | WO-2014067140 A1 * | 5/2014 | ........... | H04L 5/0048 |
| WO | 2014/107063 A1 | 7/2014 | | |
| WO | 2015179826 A1 | 11/2015 | | |
| WO | 2016006449 A1 | 1/2016 | | |

OTHER PUBLICATIONS

Office Action issued in Indian Application No. 201827029707 dated Jun. 24, 2020, 6 pages.
"3rd Generation Partnership Project; Technical Specification Group Radio Access Network; Evolved Universal Terrestrial Radio Access (E-UTRA); Physical layer procedures (Release 13)", 3GPP TS 36.213 V13.0.0 (Dec. 2015), 326 pages.
"3rd Generation Partnership Project; Technical Specification Group Radio Access Network; Evolved Universal Terrestrial Radio Access (E-UTRA); Multiplexing and channel coding (Release 13)", 3GPP TS 36.212 V13.0.0 (Dec. 2015), 121 pages.
"3rd Generation Partnership Project; Technical Specification Group Radio Access Network; Evolved Universal Terrestrial Radio Access (E-UTRA); Physical channels and modulation (Release 13)," 3GPP TS 36.211 V13.0.0 (Dec. 2015), 141 pages.
LG Electronics, "Discussion on PUSCH transmissions for MTC," R1-154237, 3GPP TSG RAN WG1 Meeting #82, Beijing, China, Aug. 24-28, 2015, 4 pages.
Pantech, "Further consideration on Aperiodic SRS solutions," R1-102840, 3GPP TSG RAN1 #61, Montreal, Canada, May 10-14, 2010, 6 pages.
ZTE, "UL framework for LAA," R1-156994, 3GPP TSG RAN WG1 Meeting #83, Anaheim, USA, Nov. 15-22, 2015, 6 pages.
Samsung, "Discussion on UL transmission for LAA," R1-152872, 3GPP TSG RAN WG1 Meeting #81, Fukuoka, Japan, May 25-29, 2015, 6 pages.
CATT et al., "Sounding reference signals in UpPTS for TDD," R1-081327, 3GPP TSG RAN WG1 meeting #52bis, Shenzhen, China, Mar. 31-Apr. 4, 2008, 2 pages.
ZTE, "Remaining Issues on LAA UL," R1-153437, 3GPP TSG RAN WG1 Meeting #81, Fukuoka, Japan, May 25-29, 2015, 6 pages.
LG Electronics, "DL/UL solutions of LAA with LBT," R1-150214, 3GPP TSG RAN WG1 Meeting #80, Athens, Greece, Feb. 9-13, 2015, 10 pages.
Office Action issued in Korean Application No. 2018-7025555 dated Dec. 17, 2019, 8 pages (with English translation).

* cited by examiner

UPLINK DATA TRANSMISSION METHOD AND RELATED DEVICE

CROSS-REFERENCE TO RELATED APPLICATIONS

This application is a continuation of International Application No. PCT/CN2016/073568, filed on Feb. 4, 2016, the disclosure of which is hereby incorporated by reference.

TECHNICAL FIELD

The present disclosure relates to the field of communications technologies, and in particular, to an uplink data transmission method and a related device.

BACKGROUND

In a Long Term Evolution (LTE) system, transmission of uplink services is based on scheduling by a base station. A basic time unit of scheduling is a subframe. A subframe includes a plurality of time domain symbols. A specific scheduling procedure is: A base station sends a control channel, for example, a physical downlink control channel (PDCCH) or an enhanced physical downlink control channel (EPDCCH). The control channel may carry scheduling information of a physical uplink shared channel (PUSCH). The scheduling information includes control information such as resource allocation information and a modulation and coding scheme. A terminal, for example user equipment (UE), detects the control channel in a subframe, and receives a downlink data channel or sends an uplink data channel based on the scheduling information carried on the detected control channel.

In an evolved LTE system (LTE-A), a carrier aggregation (CA) technology is introduced. That is, resources of a plurality of component carriers (CC) may be simultaneously allocated to one terminal for use, to achieve a higher peak rate and meet a higher service requirement. Further, because radio communications systems and operators are not limited in use in an unlicensed (unlicensed) spectrum, if LTE devices are applied to an unlicensed spectrum, not only resources in the unlicensed spectrum can be effectively used, but also more effective radio access can be provided and requirements of increasing mobile broadband services can be met. One of feasible solutions for an LTE system to use an unlicensed spectrum is that the unlicensed spectrum is used as a secondary cell (SCell) spectrum resource of an LTE base station. In addition, a cell in a licensed spectrum is used as a primary cell (PCell).

In an unlicensed spectrum resource, there is a case in which a plurality of operators of various communications systems expect to occupy a same spectrum. To achieve a coexistence feature that the plurality of communications systems are not affected by each other when occupying the unlicensed spectrum resource, a radio communications device needs to use a listen before talk (LET) rule when occupying the unlicensed spectrum for communication. That is, before using a channel, the device first listens whether the channel is idle, and if the channel is idle, the device may use the channel in the unlicensed spectrum. The device may perform, clear channel assessment (CCA) through energy detection, to determine whether the detected channel is idle.

In an LTE system, a base station uses a sounding reference signal (SRS) to estimate uplink channel quality in different frequency bands. Schedulers on the base station side may allocate, based on an uplink channel status estimate, resource blocks (RB) having a desirable instantaneous channel status to uplink PUSCHs of UE for transmission, and may select different transmission parameters (for example, an instantaneous data rate) and select different parameters related to uplink multi-antenna transmission to selectively schedule uplink frequencies. The SRS may be further used to estimate uplink timing (timing), and assuming that a downlink channel and an uplink channel benefit from each other, especially in a TDD system, downlink channel quality is estimated by using channel symmetry. In LTE, two types of SRS transmission are defined: a periodic SRS (periodic SRS) and an aperiodic SRS. The periodic SRS corresponds to a trigger type 0, and the aperiodic SRS corresponds to a trigger type 1. A set of subframe numbers that are in a system frame (10 ms) in a cell and that may be used to send an SRS needs to satisfy: $\lfloor n_s/2 \rfloor \bmod T_{SFC} \in \Delta_{SFC}$. $\Delta_{SFC}$ is an offset value, of a subframe that is used to send an SRS in a system frame (10 ms), relative to a location of a start subframe in the system frame. $\lfloor n_s/2 \rfloor$ is a subframe number, $n_s$ is a timeslot number, and $T_{SFC}$ is a period of sending an SRS by user equipment. Values of $T_{SFC}$ and $\Delta_{SFC}$ are information that is configured by an access network device for the user equipment and that is carried in a subframe configuration parameter "srs-SubframeConfig" used to send an SRS. The periodic SRS and the aperiodic SRS each have an independent configuration parameter "srs-SubframeConfig".

In an existing technical solution, if an SRS is sent in a subframe, the SRS occupies the last symbol of the subframe. If the last single-carrier frequency-division multiple access (SC-FDMA) symbol is allocated to the SRS, the symbol cannot be used in PUSCH transmission. To avoid conflicts between SRS transmission and PUSCH transmission of different UEs, all UEs should avoid sending a PUSCH in the last SC-FDMA symbol of the subframe in which the SRS is sent. All UEs in a cell should know that in which subframe set, UE may send an SRS. Therefore, an SRS subframe is configured at a cell level. In this way, all the UEs can avoid sending a PUSCH in the last SC-FDMA symbol of each of the subframes.

According to the existing technical solution, if an SRS is sent in a first uplink subframe that is configured by using a cell-level parameter, a PUSCH sent by first UE in the first uplink subframe does not occupy the last symbol, avoiding interference between the PUSCH and an SRS sent by another UE. However, on a carrier in an unlicensed spectrum, it is opportunistic whether UE can occupy a channel to send a signal. If a base station configures at least one UE to send an SRS in the first uplink subframe, but, based on a listening result, the UE cannot actually send an SRS in a symbol that is configured for sending an SRS, the first UE does not occupy the last symbol of the first uplink subframe. Consequently, when the last symbol starts, the first UE stops occupying the carrier in the unlicensed spectrum. If the first UE is scheduled to send a PUSCH in a next subframe of the first uplink subframe, the first UE needs to re-detect a busy/idle status of a channel and strives for accessing the channel. Because there are LTE systems or other radio communications systems deployed by a plurality of operators in the unlicensed spectrum, it may be possible that the first UE re-detects the busy/idle status of the channel but cannot re-obtain a channel access opportunity, causing a decrease in transmission efficiency of uplink data in the unlicensed spectrum.

For example, as shown in FIG. 1, FIG. 1 is a schematic diagram showing that UE is scheduled to transmit a PDSCH in an unlicensed spectrum resource. If UE 1 is scheduled to send a PUSCH in a subframe n, a subframe n+1, and a subframe n+2, and the subframe n+1 is configured as a subframe for sending an SRS, based on the configuration, UE 2 sends an SRS in the last symbol of the subframe n+1. After performing clear channel assessment (CCA) prior to the subframe n, the UE 1 determines that the channel can be accessed, and starts to send a PUSCH from the subframe n. However, to avoid interference with the SRS sent by the UE 2, the UE 1 has to stop sending a PUSCH in the last symbol of the subframe n+1. Consequently, the UE 1 re-detects a busy/idle status of a channel in the subframe n+2 and accessing the channel, and only after detecting that the channel is idle, the UE 1 can send data in a subframe n+3.

SUMMARY

Embodiments of the present disclosure provide an uplink data transmission method and a related device, to resolve a problem of a decrease in transmission efficiency of uplink data in an unlicensed spectrum.

Specific technical solutions provided in the embodiments of the present disclosure are as follows.

According to a first aspect, an embodiment of the present disclosure provides an uplink signal transmission method, including:

receiving, by a terminal (e.g. user equipment (UE)), signal sending indication information that is sent by an access network device for an uplink subframe, where the signal sending indication information is used to instruct the terminal to send a sounding reference signal SRS in a first symbol of the uplink subframe, and/or used to instruct the terminal to send a PUSCH in a symbol that is included in a second symbol set of the uplink subframe; and sending, by the terminal, an SRS and/or a PUSCH in the uplink subframe based on the signal sending indication information.

In all possible implementations, the first symbol and/or the symbol that is included in the second symbol set are/is sent to the terminal by the access network device by using the signal sending indication information; or the first symbol and/or the symbol that is included in the second symbol set are/is preconfigured for the terminal by the access network device.

In all possible implementations, the method further includes:

determining, by the terminal, first configuration information, where the first configuration information includes indication information of a first symbol set and/or a candidate symbol set group;

determining, by the terminal, the first symbol in the first symbol set based on the signal sending indication information; and/or determining the second symbol set in the candidate symbol set group based on the signal sending indication information.

In all possible implementations, the determining, by the terminal, first configuration information includes:

receiving, by the terminal, the first configuration information sent by the access network device; or determining, by the terminal, a type of the uplink subframe based on the signal sending indication information, and determining the first configuration information corresponding to the type of the uplink subframe based on a preset correspondence between the type of the uplink subframe and the first configuration information.

In all possible implementations, the first symbol is any candidate symbol included in the first symbol set, and the first symbol set includes at least one of the following candidate symbols:

a first candidate symbol being the $1^{st}$ symbol of the uplink subframe;

a second candidate symbol being the $2^{nd}$ symbol of the uplink subframe;

a third candidate symbol being the last symbol of the uplink subframe;

a fourth candidate symbol being the last but one symbol of the uplink subframe;

a fifth candidate symbol being a symbol corresponding to a DMRS in the $1^{st}$ timeslot of the uplink subframe;

a sixth candidate symbol being a symbol corresponding to a DMRS in the $2^{nd}$ timeslot of the uplink subframe; and a seventh candidate symbol being the last symbol in the $1^{st}$ timeslot of the uplink subframe.

In all possible implementations, the second symbol set is any candidate symbol set included in the candidate symbol set group, and any candidate symbol set in the candidate symbol set group includes K consecutive symbols, where K is a positive integer.

In all possible implementations, a value of K is 14, 13, 12, or 11.

In all possible implementations, the candidate symbol set group includes at least one of the following candidate symbol sets:

a first candidate symbol set consisting of the $1^{st}$ symbol to the last but three symbol of the uplink subframe;

a second candidate symbol set consisting of the $2^{nd}$ symbol to the last but two symbol of the uplink subframe;

a third candidate symbol set consisting of the $3^{rd}$ symbol to the last but one symbol of the uplink subframe;

a fourth candidate symbol set consisting of the $4^{th}$ symbol to the last symbol of the uplink subframe;

a fifth candidate symbol set consisting of the $1^{st}$ symbol to the last but two symbol of the uplink subframe;

a sixth candidate symbol set consisting of the $2^{nd}$ symbol to the last but one symbol of the uplink subframe;

a seventh candidate symbol set consisting of the $3^{rd}$ symbol to the last symbol of the uplink subframe;

an eighth candidate symbol set consisting of the $1^{st}$ symbol to the last but one symbol of the uplink subframe;

a ninth candidate symbol set consisting of the $2^{nd}$ symbol to the last symbol of the uplink subframe; and a tenth candidate symbol set consisting of all symbols of the uplink subframe.

In all possible implementations, if the first symbol is the first candidate symbol, the second symbol set includes A consecutive symbols, where a value of A is any one of 11, 12, or 13; and/or if the first symbol is the second candidate symbol, the second symbol set includes B consecutive symbols, where a value of B is either of 11 or 12; and/or if the first symbol is the third candidate symbol, the second symbol set includes C consecutive symbols, where a value of C is any one of 11, 12, or 13; and/or if the first symbol is the fourth candidate symbol, the second symbol set includes D consecutive symbols, where a value of D is either of 11 or 12; and the first candidate symbol is the $1^{st}$ symbol of the uplink subframe;

the second candidate symbol is the $2^{nd}$ symbol of the uplink subframe;

the third candidate symbol is the last symbol of the uplink subframe; and the fourth candidate symbol is the last but one symbol of the uplink subframe.

In all possible implementations, if the first symbol is the first candidate symbol, the second symbol set is any one of the third candidate symbol set, the sixth candidate symbol set, the seventh candidate symbol set, and the ninth candidate symbol set; and/or if the first symbol is the second candidate symbol, the second symbol set is either of the seventh candidate symbol set and the fourth candidate symbol set; and/or if the first symbol is the third candidate symbol, the second symbol set is one of the second candidate symbol set, the fifth candidate symbol set, the sixth candidate symbol set, and the eighth candidate symbol set; and/or if the first symbol is the fourth candidate symbol, the second symbol set is either of the first candidate symbol set and the fifth candidate symbol set; and the first candidate symbol is the $1^{st}$ symbol of the uplink subframe;

the second candidate symbol is the $2^{nd}$ symbol of the uplink subframe;

the third candidate symbol is the last symbol of the uplink subframe;

the fourth candidate symbol is the last but one symbol of the uplink subframe;

the first candidate symbol set consists of the $1^{st}$ symbol to the last but three symbol of the uplink subframe;

the second candidate symbol set consists of the $2^{nd}$ symbol to the last but two symbol of the uplink subframe;

the third candidate symbol set consists of the $3^{rd}$ symbol to the last but one symbol of the uplink subframe;

the fourth candidate symbol set consists of the $4^{th}$ symbol to the last symbol of the uplink subframe;

the fifth candidate symbol set consisting of the $1^{st}$ symbol to the last but two symbol of the uplink subframe;

the sixth candidate symbol set consists of the $2^{nd}$ symbol to the last but one symbol of the uplink subframe;

the seventh candidate symbol set consists of the $3^{rd}$ symbol to the last symbol of the uplink subframe;

the eighth candidate symbol set consists of the $1^{st}$ symbol to the last but one symbol of the uplink subframe; and the ninth candidate symbol set consists of the $2^{nd}$ symbol to the last symbol of the uplink subframe.

According to a second aspect, an embodiment of the present disclosure provides an uplink signal transmission method, including:

sending, by an access network device, signal sending indication information for an uplink subframe, where the signal sending indication information is used to instruct a terminal (e.g. UE) to send a sounding reference signal SRS in a first symbol of the uplink subframe, and/or used to instruct the terminal (e.g. UE) to send a PUSCH in a symbol that is included in a second symbol set of the uplink subframe; and receiving, by the access network device, an SRS and/or a PUSCH that are/is sent by the terminal in the uplink subframe based on the signal sending indication information.

In all possible implementations, the method further includes:

notifying, by the access network device by using the signal sending indication information, the terminal of the first symbol and/or the symbol that is included in the second symbol set; or preconfiguring, by the access network device, the first symbol and/or the symbol that is included in the second symbol set for the terminal.

In all possible implementations, the method further includes:

sending, by the access network device, first configuration information to the terminal, where the first configuration information includes indication information of a first symbol set and/or a candidate symbol set group, the first symbol set includes at least one candidate symbol of the first symbol, and the candidate symbol set group includes at least one candidate symbol set of the second symbol set.

In all possible implementations, the first symbol is any candidate symbol included in the first symbol set, and the first symbol set includes at least one of the following candidate symbols:

a first candidate symbol being the $1^{st}$ symbol of the uplink subframe;

a second candidate symbol being the $2^{nd}$ symbol of the uplink subframe;

a third candidate symbol being the last symbol of the uplink subframe;

a fourth candidate symbol being the last but one symbol of the uplink subframe;

a fifth candidate symbol being a symbol corresponding to a DMRS in the $1^{st}$ timeslot of the uplink subframe;

a sixth candidate symbol being a symbol corresponding to a DMRS in the $2^{nd}$ timeslot of the uplink subframe; and a seventh candidate symbol being the last symbol in the $1^{st}$ timeslot of the uplink subframe.

In all possible implementations, the second symbol set is any candidate symbol set included in the candidate symbol set group, and any candidate symbol set in the candidate symbol set group includes K consecutive symbols, where K is a positive integer.

In all possible implementations, a value of K is 14, 13, 12, or 11.

In all possible implementations, the candidate symbol set group includes at least one of the following candidate symbol sets:

a first candidate symbol set consisting of the $1^{st}$ symbol to the last but three symbol of the uplink subframe;

a second candidate symbol set consisting of the $2^{nd}$ symbol to the last but two symbol of the uplink subframe;

a third candidate symbol set consisting of the $3^{rd}$ symbol to the last but one symbol of the uplink subframe;

a fourth candidate symbol set consisting of the $4^{th}$ symbol to the last symbol of the uplink subframe;

a fifth candidate symbol set consisting of the $1^{st}$ symbol to the last but two symbol of the uplink subframe;

a sixth candidate symbol set consisting of the $2^{nd}$ symbol to the last but one symbol of the uplink subframe;

a seventh candidate symbol set consisting of the $3^{rd}$ symbol to the last symbol of the uplink subframe;

an eighth candidate symbol set consisting of the $1^{st}$ symbol to the last but one symbol of the uplink subframe;

a ninth candidate symbol set consisting of the $2^{nd}$ symbol to the last symbol of the uplink subframe; and a tenth candidate symbol set consisting of all symbols of the uplink subframe.

In all possible implementations, if the first symbol is the first candidate symbol, the second symbol set includes A consecutive symbols, where a value of A is any one of 11, 12, or 13; and/or if the first symbol is the second candidate symbol, the second symbol set includes B consecutive symbols, where a value of B is either of 11 or 12; and/or if the first symbol is the third candidate symbol, the second symbol set includes C consecutive symbols, where a value of C is any one of 11, 12, or 13; and/or if the first symbol is the fourth candidate symbol, the second symbol set includes D consecutive symbols, where a value of D is either of 11 or 12; and the first candidate symbol is the $1^{st}$ symbol of the uplink subframe;

the second candidate symbol is the $2^{nd}$ symbol of the uplink subframe;

the third candidate symbol is the last symbol of the uplink subframe; and the fourth candidate symbol is the last but one symbol of the uplink subframe.

In all possible implementations, if the first symbol is the first candidate symbol, the second symbol set is any one of the third candidate symbol set, the sixth candidate symbol set, the seventh candidate symbol set, and the ninth candidate symbol set; and/or if the first symbol is the second candidate symbol, the second symbol set is either of the seventh candidate symbol set and the fourth candidate symbol set; and/or if the first symbol is the third candidate symbol, the second symbol set is one of the second candidate symbol set, the fifth candidate symbol set, the sixth candidate symbol set, and the eighth candidate symbol set; and/or if the first symbol is the fourth candidate symbol, the second symbol set is either of the first candidate symbol set and the fifth candidate symbol set; and the first candidate symbol is the $1^{st}$ symbol of the uplink subframe;

the second candidate symbol is the $2^{nd}$ symbol of the uplink subframe;

the third candidate symbol is the last symbol of the uplink subframe;

the fourth candidate symbol is the last but one symbol of the uplink subframe;

the first candidate symbol set consists of the $1^{st}$ symbol to the last but three symbol of the uplink subframe;

the second candidate symbol set consists of the $2^{nd}$ symbol to the last but two symbol of the uplink subframe;

the third candidate symbol set consists of the $3^{rd}$ symbol to the last but one symbol of the uplink subframe;

the fourth candidate symbol set consists of the $4^{th}$ symbol to the last symbol of the uplink subframe;

the fifth candidate symbol set consists of the $1^{st}$ symbol to the last but two symbol of the uplink subframe;

the sixth candidate symbol set consists of the $2^{nd}$ symbol to the last but one symbol of the uplink subframe;

the seventh candidate symbol set consists of the $3^{rd}$ symbol to the last symbol of the uplink subframe;

the eighth candidate symbol set consists of the $1^{st}$ symbol to the last but one symbol of the uplink subframe; and the ninth candidate symbol set consists of the $2^{nd}$ symbol to the last symbol of the uplink subframe.

According to a third aspect, an embodiment of the present disclosure provides a terminal, including:

a receiving module, configured to receive signal sending indication information that is sent by an access network device for an uplink subframe, where the signal sending indication information is used to instruct the terminal (e.g. user equipment, UE) to send a sounding reference signal SRS in a first symbol of the uplink subframe, and/or used to instruct the terminal to send a PUSCH in a symbol that is included in a second symbol set of the uplink subframe; and a sending module, configured to send an SRS and/or a PUSCH in the uplink subframe based on the signal sending indication information.

In all possible implementations, the first symbol and/or the symbol that is included in the second symbol set are/is sent to the terminal by the access network device by using the signal sending indication information; or the first symbol and/or the symbol that is included in the second symbol set are/is preconfigured for the terminal by the access network device.

In all possible implementations, the terminal further includes a processing module, configured to:

determine first configuration information, where the first configuration information includes indication information of a first symbol set and/or a candidate symbol set group;

determine the first symbol in the first symbol set based on the signal sending indication information; and/or determine the second symbol set in the candidate symbol set group based on the signal sending indication information.

In all possible implementations, the receiving module is further configured to receive the first configuration information sent by the access network device; or the processing module is further configured to: determine a type of the uplink subframe based on the signal sending indication information, and determine the first configuration information corresponding to the type of the uplink subframe based on a preset correspondence between the type of the uplink subframe and the first configuration information.

In all possible implementations, the first symbol is any candidate symbol included in the first symbol set, and the first symbol set includes at least one of the following candidate symbols:

a first candidate symbol being the $1^{st}$ symbol of the uplink subframe;

a second candidate symbol being the $2^{nd}$ symbol of the uplink subframe;

a third candidate symbol being the last symbol of the uplink subframe;

a fourth candidate symbol being the last but one symbol of the uplink subframe;

a fifth candidate symbol being a symbol corresponding to a DMRS in the $1^{st}$ timeslot of the uplink subframe;

a sixth candidate symbol being a symbol corresponding to a DMRS in the $2^{nd}$ timeslot of the uplink subframe; and a seventh candidate symbol being the last symbol in the $1^{st}$ timeslot of the uplink subframe.

In all possible implementations, the second symbol set is any candidate symbol set included in the candidate symbol set group, and any candidate symbol set in the candidate symbol set group includes K consecutive symbols, where K is a positive integer.

In all possible implementations, a value of K is 14, 13, 12, or 11.

In all possible implementations, the candidate symbol set group includes at least one of the following candidate symbol sets:

a first candidate symbol set consisting of the $1^{st}$ symbol to the last but three symbol of the uplink subframe;

a second candidate symbol set consisting of the $2^{nd}$ symbol to the last but two symbol of the uplink subframe;

a third, candidate symbol set consisting of the $3^{rd}$ symbol to the last but one symbol of the uplink subframe;

a fourth candidate symbol set consisting of the $4^{th}$ symbol to the last symbol of the uplink subframe;

a fifth candidate symbol set consisting of the $1^{st}$ symbol to the last but two symbol of the uplink subframe;

a sixth candidate symbol set consisting of the $2^{nd}$ symbol to the last but one symbol of the uplink subframe;

a seventh candidate symbol set consisting of the $3^{rd}$ symbol to the last symbol of the uplink subframe;

an eighth candidate symbol set consisting of the $1^{st}$ symbol to the last but one symbol of the uplink subframe;

a ninth candidate symbol set consisting of the $2^{nd}$ symbol to the last symbol of the uplink subframe; and a tenth candidate symbol set consisting of all symbols of the uplink subframe.

In all possible implementations, if the first symbol is the first candidate symbol, the second symbol set includes A consecutive symbols, where a value of A is any one of 11, 12, or 13; and/or if the first symbol is the second candidate symbol, the second symbol set includes B consecutive symbols, where a value of B is either of 11 or 12; and/or if the first symbol is the third candidate symbol, the second symbol set includes C consecutive symbols, where a value of C is any one of 11, 12, or 13; and/or if the first symbol is the fourth candidate symbol, the second symbol set includes D consecutive symbols, where a value of D is either of 11 or 12; and the first candidate symbol is the $1^{st}$ symbol of the uplink subframe;

the second candidate symbol is the $2^{nd}$ symbol of the uplink subframe;

the third candidate symbol is the last symbol of the uplink subframe; and the fourth candidate symbol is the last but one symbol of the uplink subframe.

In all possible implementations, if the first symbol is the first candidate symbol, the second symbol set is any one of the third candidate symbol set, the sixth candidate symbol set, the seventh candidate symbol set, and the ninth candidate symbol set; and/or if the first symbol is the second candidate symbol, the second symbol set is either of the seventh candidate symbol set and the fourth candidate symbol set; and/or if the first symbol is the third candidate symbol, the second symbol set is one of the second, candidate symbol set, the fifth candidate symbol set, the sixth candidate symbol set, and the eighth candidate symbol set; and/or if the first symbol is the fourth candidate symbol, the second symbol set is either of the first candidate symbol set and the fifth candidate symbol set; and the first candidate symbol is the $1^{st}$ symbol of the uplink subframe;

the second candidate symbol is the $2^{nd}$ symbol of the uplink subframe;

the third candidate symbol is the last symbol of the uplink subframe;

the fourth candidate symbol is the last but one symbol of the uplink subframe;

the first candidate symbol set consists of the $1^{st}$ symbol to the last but three symbol of the uplink subframe;

the second candidate symbol set consists of the $2^{nd}$ symbol to the last but two symbol of the uplink subframe;

the third candidate symbol set consists of the $3^{rd}$ symbol to the last but one symbol of the uplink subframe;

the fourth candidate symbol set consists of the $4^{th}$ symbol to the last symbol of the uplink subframe;

the fifth candidate symbol set consists of the $1^{st}$ symbol to the last but two symbol of the uplink subframe;

the sixth candidate symbol set consists of the $2^{nd}$ symbol to the last but one symbol of the uplink subframe;

the seventh candidate symbol set consists of the $3^{rd}$ symbol to the last symbol of the uplink subframe;

the eighth candidate symbol set consists of the $1^{st}$ symbol to the last but one symbol of the uplink subframe; and the ninth candidate symbol set consists of the $2^{nd}$ symbol to the last symbol of the uplink subframe.

According to a fourth aspect, an embodiment of the present disclosure provides an access network device, including:

a sending module, configured to send signal sending indication information for an uplink subframe, where the signal sending indication information is used to instruct a terminal (e.g. UE) to send a sounding reference signal SRS in a first symbol of the uplink subframe, and/or used to instruct the terminal (e.g. UE) to send a PUSCH in a symbol that is included in a second symbol set of the uplink sub frame; and a receiving module, configured to receive an SRS and/or a PUSCH that are/is sent by the terminal in the uplink subframe based on the signal sending indication information.

In all possible implementations, the access network device further includes a processing module, specifically configured to:

notify, by using the signal sending indication information, the terminal of the first symbol and/or the symbol that is included in the second symbol set; or preconfigure the first symbol and/or the symbol that is included in the second symbol set for the terminal.

In all possible implementations, the sending module is further configured to:

send first configuration information to the terminal, where the first configuration information includes indication information of a first symbol set and/or a candidate symbol set group, the first symbol set includes at least one candidate symbol of the first symbol, and the candidate symbol set group includes at least one candidate symbol set of the second symbol set.

In all possible implementations, the first symbol is any candidate symbol included in the first symbol set, and the first symbol set includes at least one of the following candidate symbols:

a first candidate symbol being the $1^{st}$ symbol of the uplink subframe;

a second candidate symbol being the $2^{nd}$ symbol of the uplink subframe;

a third candidate symbol being the last symbol of the uplink subframe;

a fourth candidate symbol being the last but one symbol of the uplink subframe;

a fifth candidate symbol being a symbol corresponding to a DMRS in the $1^{st}$ timeslot of the uplink subframe;

a sixth candidate symbol being a symbol corresponding to a DMRS in the $2^{nd}$ timeslot of the uplink subframe; and a seventh candidate symbol being the last symbol in the $1^{st}$ timeslot of the uplink subframe.

In all possible implementations, the second symbol set is any candidate symbol set included in the candidate symbol set group, and any candidate symbol set in the candidate symbol set group includes K consecutive symbols, where K is a positive integer.

In all possible implementations, a value of K is 14, 13, 12, or 11.

In all possible implementations, the candidate symbol set group includes at least one of the following candidate symbol sets:

a first candidate symbol set consisting of the $1^{st}$ symbol to the last but three symbol of the uplink subframe;

a second candidate symbol set consisting of the $2^{nd}$ symbol to the last but two symbol of the uplink subframe;

a third candidate symbol set consisting of the $3^{rd}$ symbol to the last but one symbol of the uplink subframe;

a fourth candidate symbol set consisting of the $4^{th}$ symbol to the last symbol of the uplink subframe;

a fifth candidate symbol set consisting of the $1^{st}$ symbol to the last but two symbol of the uplink subframe;

a sixth candidate symbol set consisting of the $2^{nd}$ symbol to the last but one symbol of the uplink subframe;

a seventh candidate symbol set consisting of the $3^{rd}$ symbol to the last symbol of the uplink subframe;

an eighth candidate symbol set consisting of the $1^{st}$ symbol to the last but one symbol of the uplink subframe;

a ninth candidate symbol set consisting of the $2^{nd}$ symbol to the last symbol of the uplink subframe; and a tenth candidate symbol set consisting of all symbols of the uplink subframe.

In all possible implementations, if the first symbol is the first candidate symbol, the second symbol set includes A consecutive symbols, where a value of A is any one of 11, 12, or 13; and/or if the first symbol is the second candidate symbol, the second symbol set includes B consecutive symbols, where a value of B is either of 11 or 12; and/or if the first symbol is the third candidate symbol, the second symbol set includes C consecutive symbols, where a value of C is any one of 11, 12, or 13; and/or if the first symbol is the fourth candidate symbol, the second symbol set includes D consecutive symbols, where a value of D is either of 11 or 12; and the first candidate symbol is the $1^{st}$ symbol of the uplink subframe;

the second candidate symbol is the $2^{nd}$ symbol of the uplink subframe;

the third candidate symbol is the last symbol of the uplink subframe; and the fourth candidate symbol is the last but one symbol of the uplink subframe.

In all possible implementations, if the first symbol is the first candidate symbol, the second symbol set is any one of the third candidate symbol set, the sixth candidate symbol set, the seventh candidate symbol set, and the ninth candidate symbol set; and/or if the first symbol is the second candidate symbol, the second symbol set is either of the seventh candidate symbol set and the fourth candidate symbol set; and/or if the first symbol is the third candidate symbol, the second symbol set is one of the second candidate symbol set, the fifth candidate symbol set, the sixth candidate symbol set, and the eighth candidate symbol set; and/or if the first symbol is the fourth candidate symbol, the second symbol set is either of the first candidate symbol set and the fifth candidate symbol set; and the first candidate symbol is the $1^{st}$ symbol of the uplink subframe;

the second candidate symbol is the $2^{nd}$ symbol of the uplink subframe;

the third candidate symbol is the last symbol of the uplink subframe;

the fourth candidate symbol is the last but one symbol of the uplink subframe;

the first candidate symbol set consists of the $1^{st}$ symbol to the last but three symbol of the uplink subframe;

the second candidate symbol set consists of the $2^{nd}$ symbol to the last but two symbol of the uplink subframe;

the third candidate symbol set consisting of the $3^{rd}$ symbol to the last but one symbol of the uplink subframe;

the fourth candidate symbol set consists of the $4^{th}$ symbol to the last symbol of the uplink subframe;

the fifth candidate symbol set consists of the $1^{st}$ symbol to the last but two symbol of the uplink subframe;

the sixth candidate symbol set consists of the $2^{nd}$ symbol to the last but one symbol of the uplink subframe;

the seventh candidate symbol set consists of the $3^{rd}$ symbol to the last symbol of the uplink subframe;

the eighth candidate symbol set consists of the $1^{st}$ symbol to the last but one symbol of the uplink subframe; and the ninth candidate symbol set consists of the $2^{nd}$ symbol to the last symbol of the uplink subframe.

According to a fifth aspect, an embodiment of the present disclosure further provides an SRS transmission method, including:

sending, by an access network device, SRS sending indication information for an uplink subframe to a terminal; and receiving, by the access network device, an uplink signal of the terminal in the uplink subframe based on the SRS sending indication information.

In all possible implementations, if the SRS sending indication information instructs to send an SRS in a first symbol of the uplink subframe, the access network device receives the SRS in the first symbol of the uplink subframe; otherwise, the access network device does not receive the SRS in the uplink subframe.

In all possible implementations, the first symbol is any candidate symbol included in a first symbol set, and the first symbol set includes at least one of the following candidate symbols:

a first candidate symbol being the $1^{st}$ symbol of the uplink subframe;

a second candidate symbol being the $2^{nd}$ symbol of the uplink subframe;

a third candidate symbol being the last symbol of the uplink subframe;

a fourth candidate symbol being the last but one symbol of the uplink subframe;

a fifth candidate symbol being a symbol corresponding to a DMRS in the $1^{st}$ timeslot of the uplink subframe;

a sixth candidate symbol being a symbol corresponding to a DMRS in the $2^{nd}$ timeslot of the uplink subframe; and a seventh candidate symbol being the last symbol in the $1^{st}$ timeslot of the uplink subframe.

In all possible implementations, the SRS sending indication information belongs to information on a common downlink control channel that is sent by the access network device to at least two terminals.

In all possible implementations, the common downlink control channel is any one of the following:

a physical downlink control channel sent in common search space of the physical downlink control channel;

an enhanced physical downlink control channel sent in common search space of the enhanced physical downlink control channel;

a common downlink control channel sent in a resource of a hybrid automatic retransmission indicator physical channel; and a common downlink control channel sent in a resource of a physical control format indicator channel.

According to a sixth aspect, an embodiment of the present disclosure further provides an SRS transmission method, including:

receiving, by a terminal, SRS sending indication information that is sent by an access network device for an uplink subframe; and determining, by the terminal based on the SRS sending indication information, whether to send an SRS in the uplink subframe.

In all possible implementations, a first symbol is any candidate symbol included in a first symbol set, and the first symbol set includes at least one of the following candidate symbols:

a first candidate symbol being the $1^{st}$ symbol of the uplink subframe;

a second candidate symbol being the $2^{nd}$ symbol of the uplink subframe;

a third candidate symbol being the last symbol of the uplink subframe;

a fourth candidate symbol being the last but one symbol of the uplink subframe;

a fifth candidate symbol being a symbol corresponding to a DMRS in the $1^{st}$ timeslot of the uplink subframe;

a sixth candidate symbol being a symbol corresponding to a DMRS in the $2^{nd}$ timeslot of the uplink subframe; and a seventh candidate symbol being the last symbol in the $1^{st}$ timeslot of the uplink subframe.

According to a seventh aspect, an embodiment of the present disclosure further provides an access network device, including:

a sending module, configured to send SRS sending indication information for an uplink subframe to a terminal; and a receiving module, configured to receive an uplink signal of the terminal in the uplink subframe based on the SRS sending indication information.

In all possible implementations, if the SRS sending indication information instructs to send an SRS in a first symbol of the uplink subframe, the receiving module receives the SRS in the first symbol of the uplink subframe; otherwise, the receiving module does not receive the SRS in the uplink subframe.

In all possible implementations, the first symbol is any candidate symbol included in a first symbol set, and the first symbol set includes at least one of the following candidate symbols:

a first candidate symbol being the $1^{st}$ symbol of the uplink subframe;

a second candidate symbol being the $2^{nd}$ symbol of the uplink subframe;

a third candidate symbol being the last symbol of the uplink subframe;

a fourth candidate symbol being the last but one symbol of the uplink subframe;

a fifth candidate symbol being a symbol corresponding to a DMRS in the $1^{st}$ timeslot of the uplink subframe;

a sixth candidate symbol being a symbol corresponding to a DMRS in the $2^{nd}$ timeslot of the uplink subframe; and a seventh candidate symbol being the last symbol in the $1^{st}$ timeslot of the uplink subframe.

In all possible implementations, the SRS sending indication information belongs to information on a common downlink control channel that is sent by the sending module to at least two terminals.

In all possible implementations, the common downlink control channel is any one of the following:

a physical downlink control channel sent in common search space of the physical downlink control channel;

an enhanced physical downlink control channel sent in common search space of the enhanced physical downlink control channel;

a common downlink control channel sent in a resource of a hybrid automatic retransmission indicator physical channel; and a common downlink control channel sent in a resource of a physical control format indicator channel.

According to an eighth aspect, an embodiment of the present disclosure provides a terminal (e.g. UE), including:

a receiving module, configured to receive SRS sending indication information that is sent by an access network device for an uplink subframe; and a sending module, configured to determine, based on the SRS sending indication information, whether to send an SRS in the uplink subframe.

In all possible implementations, a first symbol is any candidate symbol included in a first symbol set, and the first symbol set includes at least one of the following candidate symbols:

a first candidate symbol being the $1^{st}$ symbol of the uplink subframe;

a second candidate symbol being the $2^{nd}$ symbol of the uplink subframe;

a third candidate symbol being the last symbol of the uplink subframe;

a fourth candidate symbol being the last but one symbol of the uplink subframe;

a fifth candidate symbol being a symbol corresponding to a DMRS in the $1^{st}$ timeslot of the uplink subframe;

a sixth candidate symbol being a symbol corresponding to a DMRS in the $2^{nd}$ timeslot of the uplink subframe; and a seventh candidate symbol being the last symbol in the $1^{st}$ timeslot of the uplink subframe.

According to a ninth aspect, an embodiment of the present disclosure provides a terminal. The terminal includes a processor, a memory, and a transceiver. The transceiver is configured to send and receive data under control of the processor, the memory stores a preset program, and the processor reads the program stored in the memory to perform the following processes according to the program:

receiving, by using the transceiver, signal sending indication information that is sent by an access network device for an uplink subframe, where the signal sending indication information is used to instruct the terminal (e.g. UE) to send a sounding reference signal SRS in a first symbol of the uplink subframe, and/or used to instruct the terminal to send a PUSCH in a symbol that is included in a second symbol set of the uplink subframe; and instructing the transceiver to send an SRS and/or a PUSCH in the uplink subframe based on the signal sending indication information.

In all possible implementations, the first symbol and/or the symbol that is included in the second symbol set are/is sent to the terminal by the access network device by using the signal sending indication information; or the first symbol and/or the symbol that is included in the second symbol set are/is preconfigured for the terminal by the access network device.

In all possible implementations, the processor determines first configuration information, where the first configuration information includes indication information of a first symbol set and/or a candidate symbol set group; and determines the first symbol in the first symbol set based on the signal sending indication information, and/or determines the second symbol set in the candidate symbol set group based on the signal sending indication information.

In all possible implementations, the processor receives, by using the transceiver, the first configuration information sent by the access network device; or the processor determines a type of the uplink subframe based on the signal sending indication information, and determines the first configuration information corresponding to the type of the uplink subframe based on a preset correspondence between the type of the uplink subframe and the first configuration information.

According to a tenth aspect, an embodiment of the present disclosure further provides an access network device, including a processor, a memory, and a transceiver. The transceiver is configured to send and receive data under control of the processor, the memory stores a preset program, and the processor reads the program, stored in the memory to perform the following processes according to the program:

instructing the transceiver to send, signal sending indication information for an uplink subframe, where the signal sending indication information is used, to instruct a terminal (e.g. UE) to send a sounding reference signal SRS in a first symbol of the uplink subframe, and/or used to instruct the terminal (e.g. UE) to send a PUSCH in a symbol that is included, in a second symbol set of the uplink sub frame; and receiving, by using the transceiver, an SRS and/or a PUSCH that are/is sent by the terminal in the uplink subframe based, on the signal sending indication information.

In a possible implementation, the processor notifies, by using the signal sending indication information, the terminal of the first symbol and/or the symbol that is included in the second symbol set, or preconfigures the first symbol and/or the symbol that is included in the second symbol set for the terminal.

In a possible implementation, the processor is further configured to instruct the transceiver to send first configuration information to the terminal, where the first configuration information includes indication information of a first symbol set and/or a candidate symbol set group, the first symbol set includes at least one candidate symbol of the first symbol, and the candidate symbol set group includes at least one candidate symbol set of the second symbol set.

According to an eleventh aspect, an embodiment of the present disclosure provides an access network device, including a processor, a memory, and a transceiver. The transceiver is configured to send and receive data under control of the processor, the memory stores a preset program, and the processor reads the program stored in the memory to perform the following processes according to the program:

instructing the transceiver to send SRS sending indication information for an uplink subframe to a terminal; and instructing, based on the SRS sending indication information, the transceiver to receive an uplink signal of the terminal in the uplink subframe.

According to a twelfth aspect, an embodiment of the present disclosure provides a terminal, including a processor, a memory, and a transceiver. The transceiver is configured to send and receive data under control of the processor, the memory stores a preset program, and the processor reads the program stored in the memory to perform the following processes according to the program:

receiving, by using the transceiver, SRS sending indication information that is sent by an access network device for an uplink subframe; and determining, based on the SRS sending indication information for the uplink subframe, whether to instruct the transceiver to send an SRS in the uplink subframe.

Based on the foregoing technical solutions, in the embodiments of the present disclosure, the access network device notifies the terminal of the signal sending indication information for the uplink subframe, and indicates, by using the signal sending indication information, a symbol of the uplink subframe for sending an SRS and/or a PUSCH; and the terminal sends an SRS and/or a PUSCH in the uplink subframe based on the symbol indicated by the signal sending indication information. Therefore, the terminal is dynamically scheduled to send an SRS and/or a PUSCH in an uplink subframe of an unlicensed spectrum resource, and a requirement that terminals detect a busy/idle status of a channel before the terminals send a PUSCH in the unlicensed spectrum resource that is centrally scheduled by the access network device is met, and interference of sending an SRS and/or a PUSCH between different, terminals can be avoided, thereby improving transmission efficiency of uplink data in the unlicensed spectrum resource.

DESCRIPTION OF EMBODIMENTS

To make the objectives, technical solutions, and advantages of the present disclosure clearer, the following further describes the present disclosure in detail with reference to the accompanying drawings. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, to resolve a problem that in an unlicensed spectrum resource, transmission efficiency of uplink data in the unlicensed spectrum is decreased due to that UE does not send a PUSCH in the last symbol that is of an uplink subframe and that is configured for sending an SRS, the following solution is provided: An access network device notifies UE of signal sending indication information for an uplink subframe, where the signal sending indication information indicates a symbol that is of the uplink subframe and that is for sending an SRS and/or a PUSCH; and the UE sends an SRS and/or a PUSCH in the uplink subframe based on the symbol indicated by the signal sending indication information.

In the embodiments of the present disclosure, the access network device may be a base station (eNB).

Based on this resolving idea, the present disclosure provides the following embodiments. It should be noted that in all the embodiments provided in the present disclosure, a symbol for sending a PUSCH includes a data symbol for sending a PUSCH and a symbol for sending a demodulation reference signal that is used to demodulate the PUSCH.

Figure 1:
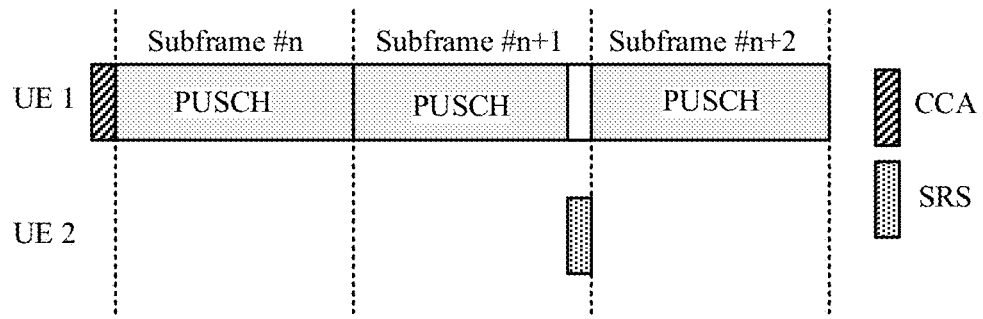
FIG. 1 is a schematic diagram showing that UE is scheduled to transmit a PDSCH in an unlicensed spectrum resource in the prior art.
Figure 2:
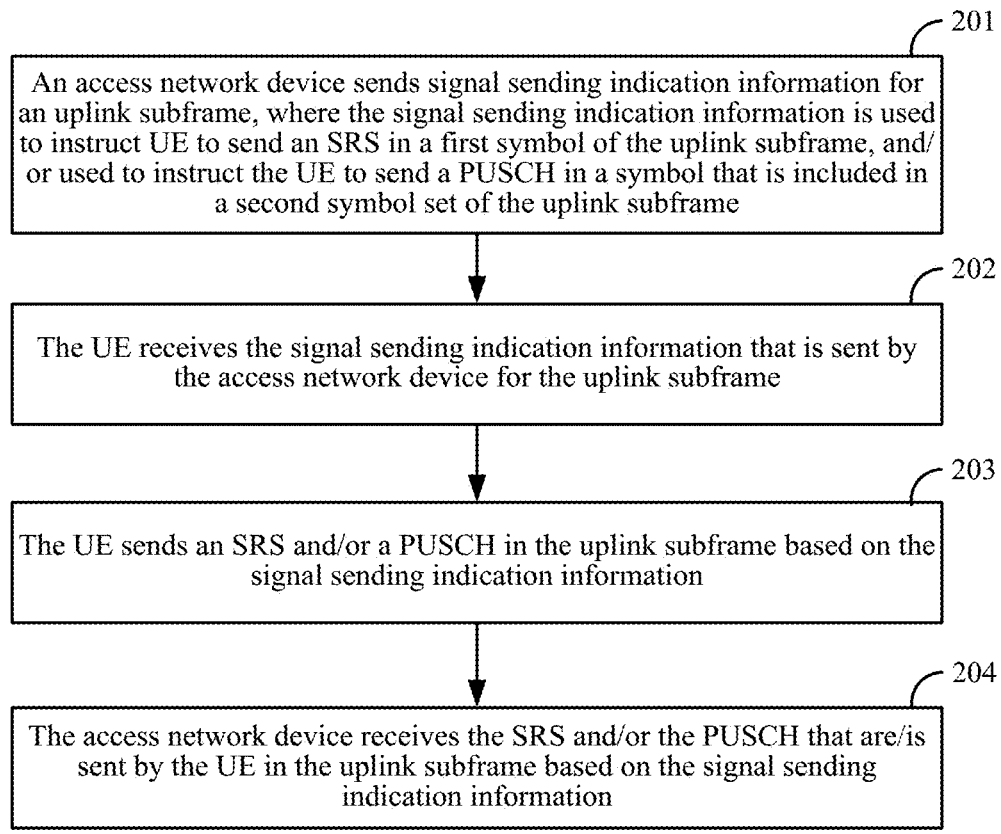
FIG. 2 is a schematic diagram of an uplink signal transmission process according to an embodiment of the present disclosure.

In an embodiment of the present disclosure, a process of performing uplink signal transmission in an unlicensed spectrum resource is shown in FIG. 2, and details are as follows.

Step 201: An access network device sends signal sending indication information for an uplink subframe, where the signal sending indication information is used to instruct UE to send an SRS in a first symbol of the uplink subframe, and/or used to instruct the UE to send a PUSCH in a symbol that is included in a second symbol set of the uplink subframe.

Specifically, if an SRS and a PUSCH are simultaneously sent in a same uplink subframe, locations of the first symbol and the symbol that is included in the second symbol set do not overlap each other.

In the following embodiments, it is assumed that a next subframe of a first uplink subframe is referred to as a second uplink subframe.

In this embodiment of the present disclosure, it is assumed that the access network device needs to schedule UE 1 in the first uplink subframe to send a PUSCH and/or an SRS. Depending on whether to schedule at least another one UE (using UE 2 as an example) in the second uplink subframe to send data, the access network device determines whether there is a need to reserve a time in the first uplink subframe, for example, in the last symbol of the first uplink subframe, before the first uplink subframe ends, for the UE 2 to detect a busy/idle status of a channel before the UE 2 sends data in the second uplink subframe. Whether the time is reserved in the first uplink subframe for the UE 2 to detect the busy/idle status of the channel before the UE 2 sends data in the second uplink subframe affects a length and/or a location of a symbol occupied by the UE 1 to send a PUSCH and/or an SRS in the first uplink subframe. Because the UE 1 cannot learn whether the access network device schedules the UE 2 in the second uplink subframe, and whether there is a need to reserve the time in the first uplink subframe for the UE 2 to detect the busy/idle status of the channel before the UE 2 sends data in the second uplink subframe, the UE 1 needs to determine, based on the signal sending indication information that is sent by the access network device for the first uplink subframe, the symbol that is included in the second symbol set and that is for sending a PUSCH in the first uplink subframe and/or the first symbol for sending an SRS in the first uplink subframe.

(1) If the access network device schedules the UE 1 to send a PUSCH in the first uplink subframe, and needs to reserve the last symbol of the first uplink subframe as the time for the UE 2 to detect the busy/idle status of the channel, the PUSCH sent by the UE 1 in the first uplink subframe cannot, occupy the last, symbol of the first uplink subframe. The access network device sends the signal sending indication information for the first uplink subframe to the UE 1, and instructs, by using the signal sending indication information, the UE 1 to send a PUSCH in the symbol that is included in the second symbol set in the first uplink subframe, where the second symbol set does not include the last symbol of the first uplink subframe.

If there is no need to reserve the last symbol of the first uplink subframe as the time for the UE 2 to detect the busy/idle status of the channel, the PUSCH sent by the UE 1 in the first uplink subframe may occupy the last symbol of the first uplink subframe. The access network device sends the signal sending indication information for the first uplink subframe to the UE 1, and instructs, by using the signal sending indication information, the UE 1 to send a PUSCH in the symbol that is included in the second symbol set in the first uplink subframe, where the second symbol set includes the last symbol of the first uplink subframe.

In addition, a quantity and locations of symbols that are included in the second symbol set and that are used by the UE 1 to send a PUSCH in the first uplink subframe may further depend on whether there is a symbol that is in the first uplink subframe and that is used by the UE 1 and/or another UE to send an SRS, and whether there is a symbol for the another UE to detect a busy/idle status of a channel before the another UE sends an SRS in the first uplink subframe. The symbol that is included in the second symbol set and that is used by the UE 1 to send a PUSCH in the first uplink subframe does not include the symbol that is in the first uplink subframe and that is used by the UE and/or the another UE to send an SRS, and the symbol used by the another UE to detect the busy/idle status of the channel before the another UE sends an SRS in the first uplink subframe.

Therefore, the UE 1 needs to determine, based on the signal sending indication information that is sent by the access network device for the first uplink subframe, the symbol that is included in the second symbol set and that is for sending a PUSCH in the first uplink subframe.

(2) If the access network device schedules the UE 1 to send an SRS in the first uplink subframe, and needs to reserve the last symbol of the first uplink subframe as the time for the UE 2 to detect the busy/idle status of the channel, the UE 1 cannot occupy the last symbol of the first uplink subframe to send an SRS in the first uplink subframe. The access network device sends the signal sending indication information for the first uplink subframe to the UE 1, and instructs, based on the signal sending indication information, the UE 1 to send an SRS in one of other symbols than the last symbol of the first uplink subframe.

If there is no need to reserve the last symbol of the first uplink subframe as the time for the UE 2 to detect the busy/idle status of the channel, the UE 1 may occupy the last symbol of the first uplink subframe to send an SRS in the first uplink subframe. The access network device sends the signal sending indication information for the first uplink subframe to the UE 1, and instructs, based on the signal sending indication information, the UE 1 to send an SRS in the last symbol of the first uplink subframe.

Therefore, the UE 1 needs to determine, based on the signal sending indication information that is sent by the access network devices for the first uplink subframe, the first symbol for sending an SRS in the first uplink subframe.

(3) If the access network device schedules the UE 1 to send both a PUSCH and an SRS in the first uplink subframe, the symbol that is included in the second symbol set and that is used by the UE 1 to send a PUSCH in the first uplink subframe is affected by whether the time is reserved in the first uplink subframe for the UE 2 to detect the busy/idle status of the channel, and affected by a location of the first symbol for sending an SRS in the first uplink subframe and a location of a symbol for another UE to detect a busy/idle status of a channel before the another UE sends an SRS in the first uplink subframe.

Therefore, the UE 1 needs to determine, based on the signal sending indication information that is sent by the access network device for the first uplink subframe, the first symbol for sending an SRS in the first uplink subframe and the symbol that is included in the second symbol set and that is for sending a PUSCH in the first uplink subframe.

In this embodiment of the present disclosure, if the access network device needs to schedule the UE 1 in the first uplink subframe to send a PUSCH and/or an SRS, and needs to schedule the UE 2 in the first uplink subframe to send an SRS but not to send a PUSCH, before scheduling the UE 2 in the first uplink subframe to send an SRS, the access network device needs to reserve a time in the first uplink subframe for the UE 2 to detect the busy/idle status of the channel before the UE 2 sends an SRS. Whether the time is reserved in the first uplink subframe for the UE 2 to detect the busy/idle status of the channel before the UE 2 sends an SRS in the first uplink subframe affects a length and/or a location of a symbol occupied by the UE 1 to send a PUSCH and/or an SRS in the first uplink subframe.

Because the UE 1 cannot learn whether the access network device schedules the UE 2 to send an SRS in the first uplink subframe, and whether there is a symbol of the first uplink subframe for the UE or another UE to detect a busy/idle status of a channel, the UE 1 needs to determine, based on the signal sending indication information that is sent by the access network device for the first uplink subframe, the symbol that is included in the second symbol set and that is for sending a PUSCH in the first uplink subframe and/or the first symbol for sending an SRS in the first uplink subframe.

Further, a location at which the UE 1 is scheduled by the access network device to detect a busy/idle status of a channel before the UE 1 sends data in the first uplink subframe may be the $1^{st}$ symbol of the first uplink subframe, and whether the $1^{st}$ symbol of the first uplink subframe is reserved as the time for the UE 1 to detect the busy/idle status of the channel affects a length and/or a location of a symbol occupied by other UEs than the UE 1 to send a PUSCH and/or an SRS in the first uplink subframe. Because the other UEs than the UE 1 cannot learn whether the access network device schedules the UE 1 to send data in the first uplink subframe, and whether the access network device reserves a time in the first uplink subframe for the UE 1 to detect the busy/idle status of the channel before the UE 1 sends data, the other UEs than the UE 1 need to determine, based on the signal sending indication information that is sent by the access network device for the first uplink subframe, the symbol that is included in the second symbol set and that is for sending a PUSCH in the first uplink subframe, and/or the first symbol for sending an SRS in the first uplink subframe.

Figure 3:
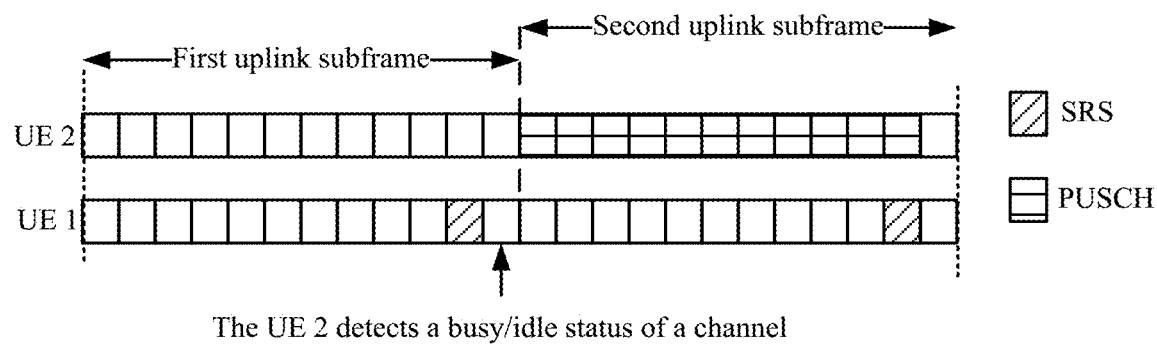
FIG. 3 is a schematic diagram of a process of generating signal sending indication information for an uplink subframe by an access network device according to an embodiment of the present disclosure.

Using FIG. 3 as an example, if the access network device needs to schedule the UE 2 in the second uplink subframe to send data, and reserve the last symbol of the first uplink subframe as a time for the UE 2 to detect a busy/idle status of a channel, the access network device sends the signal sending indication information for the first uplink subframe to the UE 1. The signal sending indication information may instruct the UE 1 to send an SRS in the last but one symbol of the first uplink subframe. Certainly, the signal sending indication information may also instruct the UE 1 to send a PUSCH in other symbols than the last symbol and the last but one symbol of the first uplink subframe, or instruct the UE 1 to send a PUSCH in other symbols than the last symbol and the last but one symbol of the first uplink subframe and send an SRS in the last but one symbol.

Step 202: The UE receives the signal sending indication information that is sent by the access network device for the uplink subframe.

During implementation, the UE obtains the signal sending indication information that is sent by the access network device for the uplink subframe, where the signal sending indication information is indication information used to instruct the UE to send an SRS in the first symbol of the uplink subframe, and/or indication information used to instruct the UE to send a PUSCH in the symbol that is included in the second symbol set of the uplink subframe.

Preferably, the access network device sends the signal sending indication information for the uplink subframe to the UE by using physical layer channel information. For example, the access network device sends the signal sending indication information by using a PDCCH or an EPDCCH.

Optionally, the UE determines first configuration information, where the first configuration information includes indication information of a first symbol set and/or a candidate symbol set group. The first symbol, indicated by the signal sending indication information that is sent by the access network device for the uplink subframe, for the UE to send an SRS in the uplink subframe is a symbol in the first symbol set in the first configuration information; and/or the second symbol set, indicated by the signal sending indication information that is sent by the access network device for the uplink subframe, for the UE to send a PUSCH in the uplink subframe is a set in the candidate symbol set group in the first configuration information.

The UE determines, based on the signal sending indication information for the uplink subframe, the first symbol in the first symbol set that is included in the first configuration information, and/or determines, based on the signal sending indication information for the uplink subframe, the second symbol set in the candidate symbol set group that is included in the first configuration information.

During implementation, manners for the UE to determine the first configuration information include but are not limited to the following two manners:

First, the UE receives the first configuration information sent by the access network device.

Second, the UE determines a type of the uplink subframe based on the signal sending indication information, and determines the first configuration information corresponding to the type of the uplink subframe based on a preset correspondence between the type of the uplink subframe and the first configuration information. Specifically, the type of the uplink subframe may include two types: a type for sending an SRS and a type not for sending an SRS.

For example, the preset correspondence between the type of the uplink subframe and the first configuration information is as follows: If the type of the uplink subframe is the type for sending an SRS, the first configuration information is: The first symbol set includes {a candidate symbol $A_1$, a candidate symbol $B_1$, . . . , and a candidate symbol $N_1$}, and/or the candidate symbol set group includes {a candidate symbol set $O_1$ including (a symbol $P_1$, a symbol $P_2$, . . . ), a candidate symbol set $O_2$ including (a symbol $Q_1$, a symbol $Q_2$, . . . ), and a candidate symbol set $O_3$ including (a symbol $R_1$, a symbol $R_2$, . . . )}.

If the type of the uplink subframe is the type not for sending an SRS, the first configuration information is: The first symbol set is an empty set, and the candidate symbol set group includes {a candidate symbol set $X_1$ including (a symbol $U_1$, a symbol $U_2$, . . . ), a candidate symbol set $X_2$ including (a symbol $V_1$, a symbol $V_2$, . . . ), and a candidate symbol set $X_3$ including (a symbol $W_1$, a symbol $W_2$, . . . )}.

{The candidate symbol set $O_1$ including (the symbol $P_1$, the symbol $P_2$, . . . ), the candidate symbol set $O_2$ including (the symbol $Q_1$, the symbol $Q_2$, . . . ), and the candidate symbol set $O_3$ including (the symbol $R_1$, the symbol $R_2$, . . . )} are different from {the candidate symbol set $X_1$ including (the symbol $U_1$, the symbol $U_2$, . . . ), the candidate symbol set $X_2$ including (the symbol $V_1$, the symbol $V_2$, . . . ), and the candidate symbol set $X_3$ including (the symbol $W_1$, the symbol $W_2$, . . . )}.

After determining the type of the uplink subframe, the UE determines the first configuration information corresponding to the uplink subframe based on the preset correspondence between the type of the uplink subframe and the first configuration information.

Step 203: The UE sends an SRS and/or a PUSCH in the uplink subframe based on the signal sending indication information.

During implementation, the UE sends an SRS in the first symbol of the uplink subframe based on the signal sending indication information, and/or sends a PUSCH in the symbol that is included in the second symbol set of the uplink subframe.

During implementation, before the UE sends an SRS in the first symbol of the uplink subframe, if the UE does not need to determine a busy/idle status of a channel in the first symbol of the uplink subframe, and if the UE determines that the signal sending indication information instructs to send an SRS in the first symbol of the uplink subframe, the UE sends an SRS in the first symbol of the uplink subframe; or if the UE determines that the signal sending indication information instructs not to send an SRS in the uplink subframe, the UE does not send an SRS in the uplink subframe.

Before the UE sends an SRS in the first symbol of the uplink subframe, if the UE needs to determine a busy/idle status of a channel in the first symbol of the uplink subframe, the UE determines, based on a determining result of the busy/idle status of the channel, whether to send an SRS in the first symbol of the uplink subframe. Specifically, if the UE determines that the signal sending indication information instructs to send an SRS in the first symbol of the uplink subframe, and determines that the channel in the first symbol of the uplink subframe is idle, the UE sends an SRS in the first symbol of the uplink subframe; otherwise, the UE does not send an SRS in the first symbol of the uplink subframe.

Figure 4:
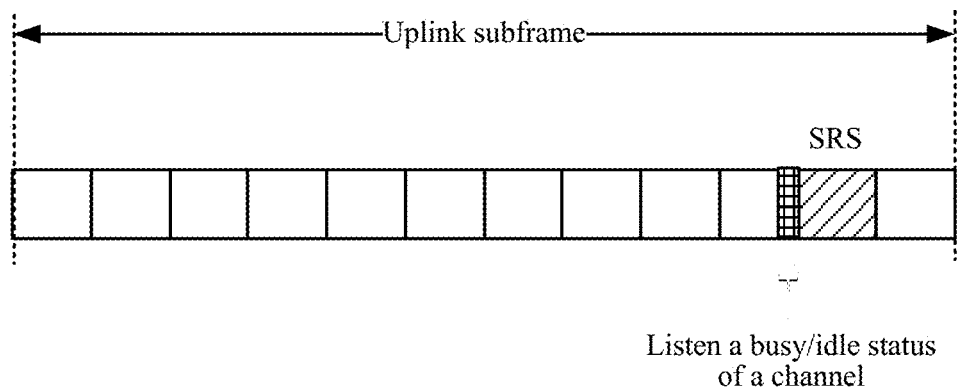
FIG. 4 is a schematic diagram, of a location at which a busy/idle status of a channel is listened in an uplink subframe according to an embodiment of the present disclosure.

For example, assuming that the first symbol is the last but one symbol of the uplink subframe, the UE determines that the signal sending indication information for the uplink subframe instructs to send an SRS in the first symbol of the uplink subframe, and the UE needs to determine a busy/idle status of a channel in the first symbol of the uplink subframe. The UE may determine whether to send an SRS in the first symbol of the uplink subframe in the following two manners:

First, as shown in FIG. 4, before the last but one symbol of the uplink subframe arrives, the UE listens a busy/idle status of a channel in the last but one symbol. If a listening result is that the channel in the last but one symbol of the uplink subframe is idle, the UE sends an SRS in the last but one symbol of the uplink subframe; or if a listening result is that the channel in the last but one symbol of the uplink subframe is not idle, the UE does not send an SRS in the uplink subframe.

Figure 5:
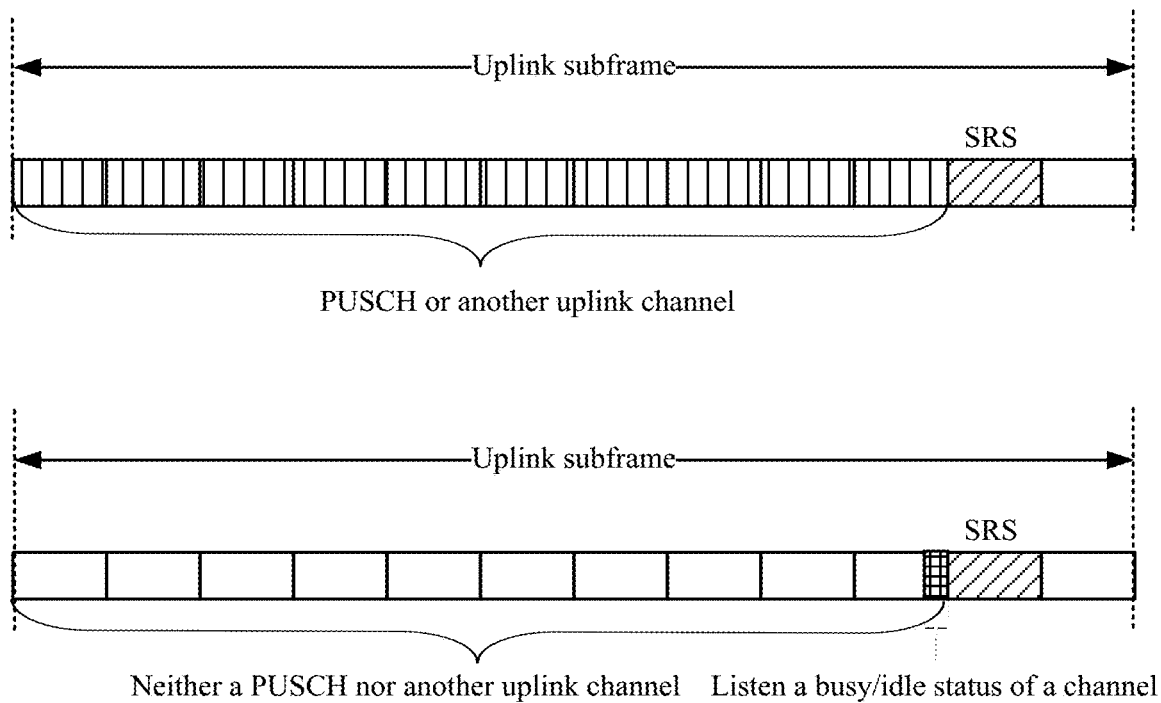
FIG. 5 is a schematic diagram of a location at which a busy/idle status of a channel is listened in another uplink subframe according to an embodiment of the present disclosure.

Second, as shown in FIG. 5, if the UE sends a PUSCH or another uplink channel on a channel in a symbol prior to the last but one symbol of the uplink subframe, the UE determines that a channel in the last but one symbol of the uplink subframe is idle, and the UE sends an SRS in the last but one symbol of the uplink subframe. If the UE does not occupy a channel prior to the last but one symbol of the uplink subframe to send a PUSCH or another uplink channel, the UE listens a busy/idle status of the channel in the symbol prior to the last but one symbol of the uplink subframe, and determines, based on a listening result, whether to send an SRS in the last but one symbol of the uplink subframe. If the listening result is that the channel in the last but one symbol of the uplink subframe is idle, the UE sends an SRS in the last but one symbol of the uplink subframe; or if the listening result is that the channel in the last but one symbol of the uplink subframe is not idle, the UE does not send an SRS in the uplink subframe.

Step 204: The access network device receives the SRS and/or the PUSCH that are/is sent by the UE in the uplink subframe based on the signal sending indication information.

During implementation, the access network device receives the SRS in the first symbol of the uplink subframe, and/or receives the PUSCH in the symbol that is included in the second symbol set of the uplink subframe.

During implementation, the first symbol is any candidate symbol included in the first symbol set, and the first symbol set includes at least one of the following candidate symbols:

a first candidate symbol being the $1^{st}$ symbol of the uplink subframe;

a second candidate symbol being the $2^{nd}$ symbol of the uplink subframe;

a third candidate symbol being the last symbol of the uplink subframe;

a fourth candidate symbol being the last but one symbol of the uplink subframe;

a fifth candidate symbol being a symbol corresponding to a DMRS in the $1^{st}$ timeslot of the uplink subframe;

a sixth candidate symbol being a symbol corresponding to a DMRS in the $2^{nd}$ timeslot of the uplink subframe; and a seventh candidate symbol being the last symbol in the $1^{st}$ timeslot of the uplink subframe.

During implementation, the second symbol set is a set in the candidate symbol set group, and symbols included in each candidate symbol set in the candidate symbol set group are K consecutive symbols. For example, a value of K is 11, 12, 13, or 14.

During implementation, the candidate symbol set group includes at least one of the following candidate symbol sets:

a first candidate symbol set consisting of the $1^{st}$ symbol to the last but three symbol of the uplink subframe;

a second candidate symbol set consisting of the $2^{nd}$ symbol to the last but two symbol of the uplink subframe;

a third candidate symbol set consisting of the $3^{rd}$ symbol to the last but one symbol of the uplink subframe;

a fourth candidate symbol set consisting of the $4^{th}$ symbol to the last symbol of the uplink subframe;

a fifth candidate symbol set consisting of the $1^{st}$ symbol to the last but two symbol of the uplink subframe;

a sixth candidate symbol set consisting of the $2^{nd}$ symbol to the last but one symbol of the uplink subframe;

a seventh candidate symbol set consisting of the $3^{rd}$ symbol to the last symbol of the uplink subframe;

an eighth candidate symbol set consisting of the $1^{st}$ symbol to the last but one symbol of the uplink subframe;

a ninth candidate symbol set consisting of the $2^{nd}$ symbol to the last symbol of the uplink subframe; and a tenth candidate symbol set consisting of all symbols of the uplink subframe.

In a normal cyclic prefix scenario, the last but three symbol is the $11^{th}$ symbol, the last but two symbol is the $12^{th}$ symbol, the last but one symbol is the $13^{th}$ symbol, and the last symbol is the $14^{th}$ symbol.

During implementation, assuming that $K_1=14$, $K_2=13$, $K_3=12$, and $K_4=11$, combination manners of the first symbol and the second symbol set are:

if the first symbol is the first candidate symbol, the second symbol set is a candidate symbol set that is included in the candidate symbol set group and whose symbols are $K_2$ consecutive symbols, or the second symbol set is a candidate symbol set that is included in the candidate symbol set group and whose symbols are $K_3$ consecutive symbols, or the second symbol set is a candidate symbol set that is included in the candidate symbol set group and whose symbols are $K_4$ consecutive symbols; and/or if the first symbol is the second candidate symbol, the second symbol set is a candidate symbol set that is included in the candidate symbol set group and whose symbols are $K_3$ consecutive symbols, or the second symbol set is a candidate symbol set that is included in the candidate symbol set group and whose symbols are $K_4$ consecutive symbols; and/or if the first symbol is the third candidate symbol, the second symbol set is a candidate symbol set that is included in the candidate symbol set group and whose symbols are $K_2$ consecutive symbols, or the second symbol set is a candidate symbol set that is included in the candidate symbol set group and whose symbols are $K_3$ consecutive symbols, or the second symbol set is a candidate symbol set that is included in the candidate symbol set group and whose symbols are $K_4$ consecutive symbols; and/or if the first symbol is the fourth candidate symbol, the second symbol set is a candidate symbol set that is included in the candidate symbol set group and whose symbols are $K_3$ consecutive symbols, or the second symbol set is a candidate symbol set that is included in the candidate symbol set group and whose symbols are $K_4$ consecutive symbols.

During implementation, preferable combination manners of the first symbol and the second symbol set include but are not limited to the following:

if the first symbol is the first candidate symbol, the second symbol set is any one of the third candidate symbol set, the sixth candidate symbol set, the seventh candidate symbol set, and the ninth candidate symbol set; and/or if the first symbol is the second candidate symbol, the second symbol set is either of the seventh candidate symbol set and the fourth candidate symbol set; and/or if the first symbol is the third candidate symbol, the second symbol set is one of the second candidate symbol set, the fifth candidate symbol set, the sixth candidate symbol set, and the eighth candidate symbol set; and/or if the first symbol is the fourth candidate symbol, the second symbol set is either of the first candidate symbol set and the fifth candidate symbol set.

A relationship between the first symbol and the second symbol set of the uplink subframe is described below by using several specific examples.

First Specific Embodiment

The access network device does not need to schedule the UE to send an SRS in the uplink subframe.

Figure 6A:
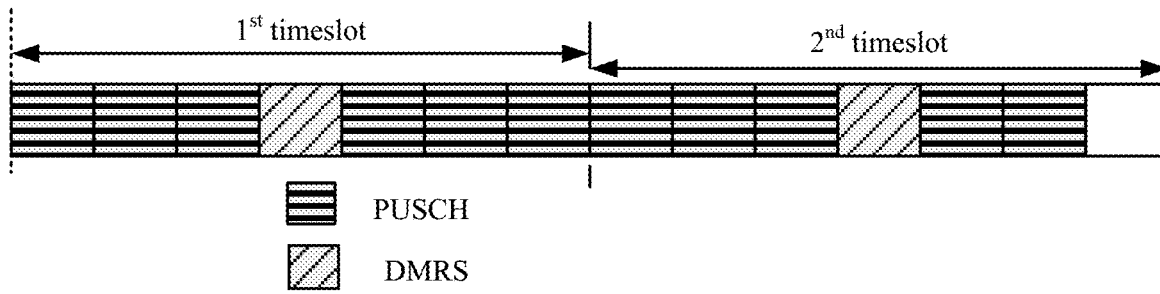
FIG. 6a is a schematic diagram of channel distribution in an uplink subframe according to a first specific embodiment of the present disclosure.

In addition, if the access network device needs to reserve a time in the uplink subframe to detect a busy/idle status of a channel in the uplink subframe before uplink data is sent in a next uplink subframe, it may be determined that the second symbol set includes the $1^{st}$ symbol to the last but one symbol of the uplink subframe, namely, the eighth candidate symbol set in the candidate symbol set group. The $4^{th}$ symbol and the last but three symbol of the uplink subframe are used to send a DMRS, and the last symbol of the uplink subframe is used for CCA detection of a next subframe, as shown in FIG. 6a.

Figure 6B:
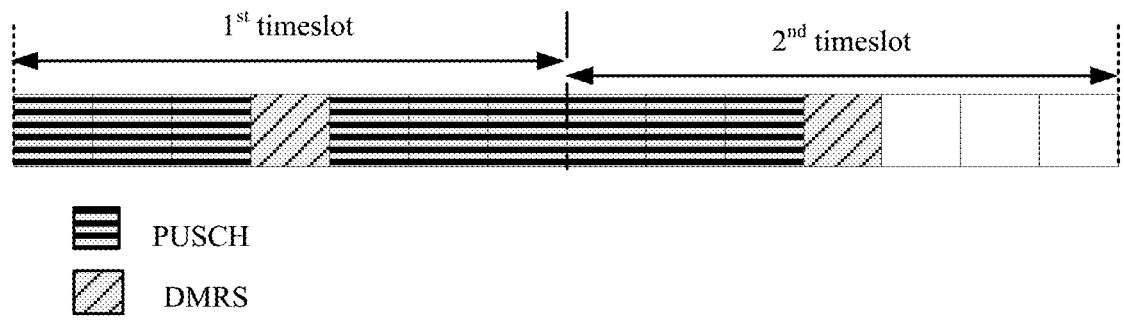
FIG. 6b is a schematic diagram of channel distribution in another uplink subframe according to the first specific embodiment of the present disclosure.

Alternatively, if the access network device needs to reserve a time in the uplink subframe for UE that occupies the uplink subframe, to detect a busy/idle status of a channel in the uplink subframe, and needs to reserve a time in the uplink subframe for another UE to detect a busy/idle status of a channel before the another UE sends an SRS and reserve a time for the another UE to send the SRS, it may be determined that the second symbol set consists of the $1^{st}$ symbol to the last but three symbol of the uplink subframe, namely, the first candidate symbol set in the candidate symbol set group. The $4^{th}$ symbol and the last but three symbol of the uplink subframe are used to send a DMRS, the last symbol of the uplink subframe is used for CCA detection of a next subframe, the last but two symbol of the uplink subframe is used for CCA detection by the another UE, and the last but one symbol of the uplink subframe is used by the another UE to send an SRS, as shown in FIG. 6b.

Figure 6C:
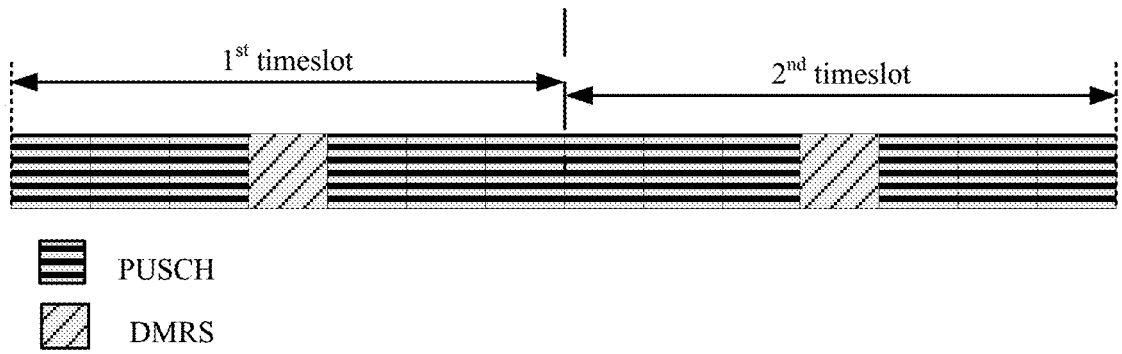
FIG. 6c is a schematic diagram of channel distribution in another uplink subframe according to the first specific embodiment of the present disclosure.

Alternatively, if the access network device does not need to reserve a time in the uplink subframe for UE that occupies the uplink subframe, to detect a busy/idle status of a channel in the uplink subframe, it may be determined that the second symbol set includes all symbols in the uplink subframe, namely, the tenth candidate symbol set of the candidate symbol set group. The $4^{th}$ symbol and the last but three symbol of the uplink subframe are used to send a DMRS, and a location of a symbol in the uplink subframe for CCA detection of a next subframe, as shown in FIG. 6c.

Figure 6D:
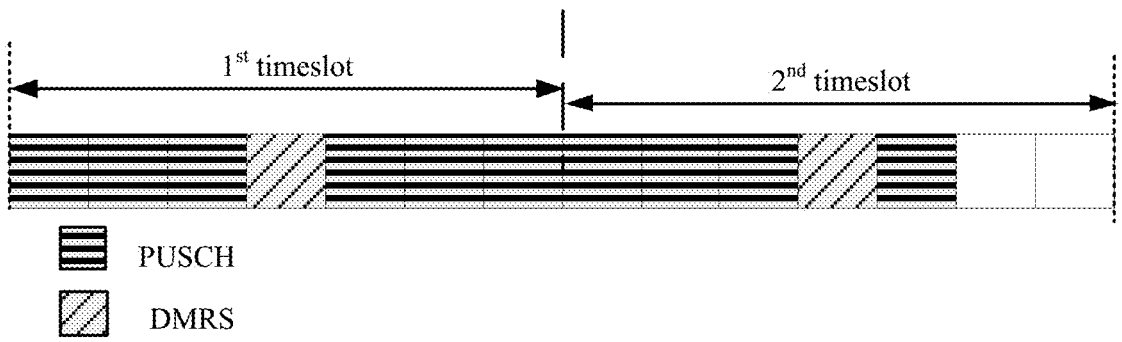
FIG. 6d is a schematic diagram of channel distribution in another uplink subframe according to the first specific embodiment of the present disclosure.
Figure 6E:
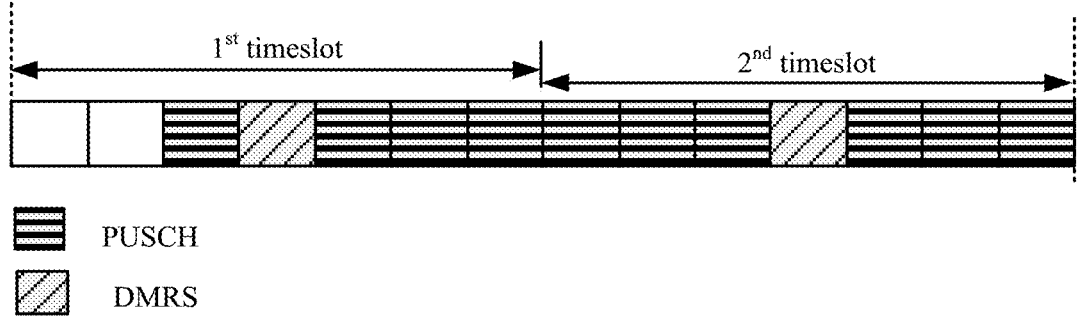
FIG. 6e is a schematic diagram, of channel distribution in another uplink subframe according to the first specific embodiment of the present disclosure.

Alternatively, if the access network device does not need to reserve a time in the uplink subframe for UE that occupies the uplink subframe, to detect a busy/idle status of a channel in the uplink subframe, but needs to reserve a time in the uplink subframe for another UE to detect a busy/idle status of a channel before the another UE sends an SRS and reserve a time for the another UE to send the SRS, it may be determined that the second symbol set includes the $1^{st}$ symbol to the last but two symbol of the uplink subframe, namely, the fifth candidate symbol set in the candidate symbol set group. The $4^{th}$ symbol and the last but three symbol of the uplink subframe are used to send a DMRS, and there is no need to reserve a location of a symbol in the uplink subframe for CCA detection of a next subframe, but a location of a symbol is reserved in the uplink subframe for CCA detection by the another UE before the another UE sends an SRS, as shown in FIG. 6d.

Alternatively, if the access network device needs to reserve a time in the uplink subframe for another UE to detect, a busy/idle status of a channel before the another UE sends an SRS and reserve a time for the another UE to send the SRS, it may be determined that, the second symbol, set includes the $3^{rd}$ symbol to the last symbol, of the uplink subframe, namely, the seventh candidate symbol set in the candidate symbol set group. The $4^{th}$ symbol and the last but three symbol of the uplink subframe are used to send a DMRS, and the $1^{st}$ symbol of the uplink subframe is used by the another UE to send an SRS, as shown in FIG. e.

Figure 6F:
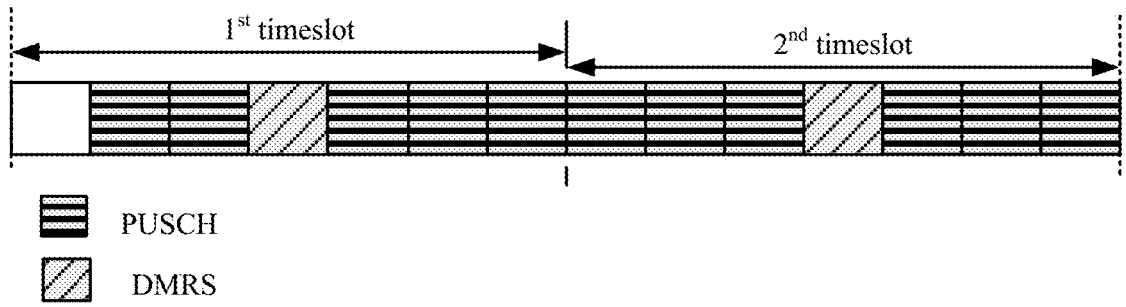
FIG. 6f is a schematic diagram of channel distribution in another uplink subframe according to the first specific embodiment of the present disclosure.

Alternatively, if the access network device needs to reserve a time in the uplink subframe to detect a busy/idle status of a channel in the uplink subframe before uplink data is sent, it may be determined that the second symbol, set includes the $2^{nd}$ symbol to the last symbol of the uplink subframe, namely, the ninth candidate symbol set in the candidate symbol set group. The $4^{th}$ symbol and the last but three symbol of the uplink subframe are used to send a DMRS, and the $1^{st}$ symbol of the uplink subframe is used for CCA detection, as shown in FIG. 6f.

Figure 6G:
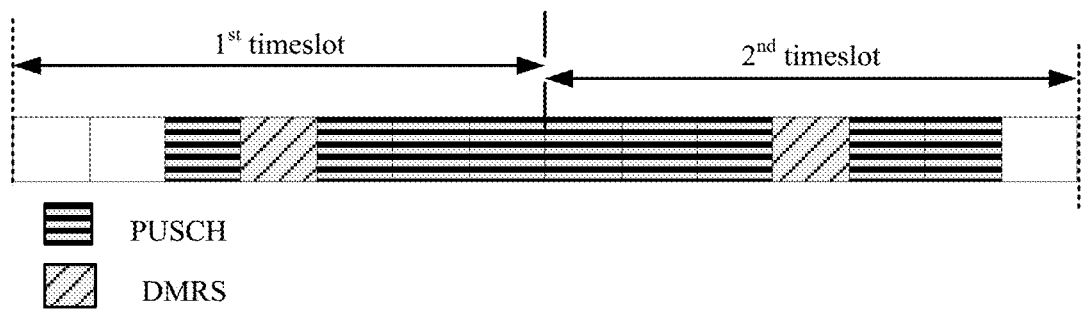
FIG. 6g is a schematic diagram, of channel distribution in another uplink subframe according to the first specific embodiment of the present disclosure.

Alternatively, if the access network device needs to reserve a time in the uplink subframe for another UE to detect a busy/idle status of a channel in the uplink subframe, and needs to reserve a time in the uplink subframe for the another UE to detect the busy/idle status of the channel before the another UE sends an SRS and reserve a time for the another UE to send the SRS, it may be determined that the second symbol set includes the $3^{rd}$ symbol to the last but one symbol of the uplink subframe, namely, the third candidate symbol set in the candidate symbol set group. The $4^{th}$ symbol and the last but three symbol of the uplink subframe are used to send a DMRS, the $1^{st}$ symbol of the uplink subframe is used by the another UE to send an SRS, the $2^{nd}$ symbol of the uplink subframe is used for CCA detection by the another UE, and the last symbol of the uplink subframe is used for CCA detection of a next subframe, as shown in FIG. 6g.

Figure 6H:
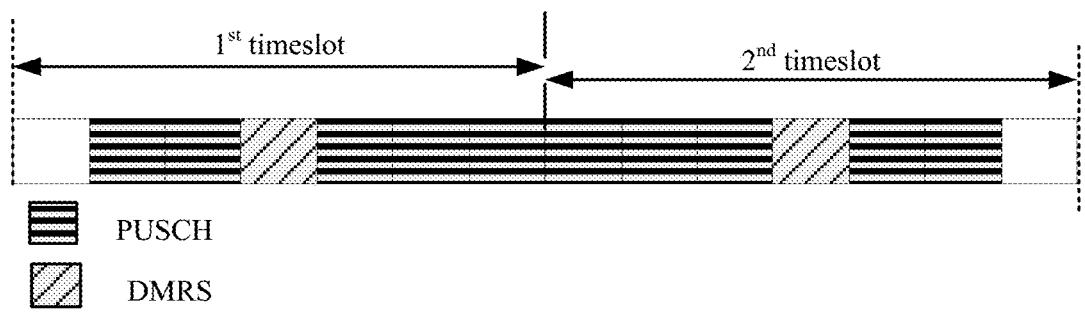
FIG. 6h is a schematic diagram of channel distribution in another uplink subframe according to the first specific embodiment of the present disclosure.

Alternatively, if the access network device needs to reserve a time in the uplink subframe for another UE to detect a busy/idle status of a channel in the uplink subframe, and needs to reserve a time in the uplink subframe for the another UE to detect the busy/idle status of the channel before the another UE sends an SRS, it may be determined that the second symbol set includes the $2^{nd}$ symbol to the last but one symbol of the uplink subframe, namely, the sixth candidate symbol set in the candidate symbol set group. The $4^{th}$ symbol and the last but three symbol of the uplink subframe are used to send a DMRS, and the $1^{st}$ symbol of the uplink subframe is used by the another UE to send an SRS, and the last symbol of the uplink subframe is used for CCA detection of a next subframe, as shown in FIG. 6h.

Figure 6K:
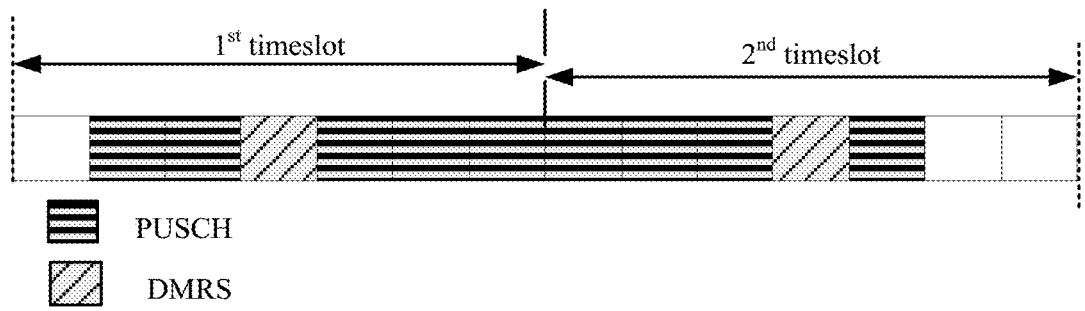
FIG. 6k is a schematic diagram of channel distribution in another uplink subframe according to the first specific embodiment of the present disclosure.

Alternatively, if the access network device needs to reserve a time in the uplink subframe to detect a busy/idle status of a channel in the uplink subframe, and needs to reserve a time in the uplink subframe for another UE to detect a busy/idle status of a channel before the another UE sends an SRS and reserve a time for the another UE to send the SRS, it may be determined that the second symbol set includes the $2^{nd}$ symbol to the last but two symbol of the uplink subframe, namely, the second candidate symbol set in the candidate symbol set group. The $4^{th}$ symbol and the last but three symbol of the uplink subframe are used to send a DMRS, the $1^{st}$ symbol of the uplink subframe is used to detect the busy/idle status of the channel, the last but one symbol of the uplink subframe is used for CCA detection by the another UE before the another UE sends an SRS, and the last symbol of the uplink subframe is used by the another UE to send an SRS, as shown in FIG. 6k.

Figure 6M:
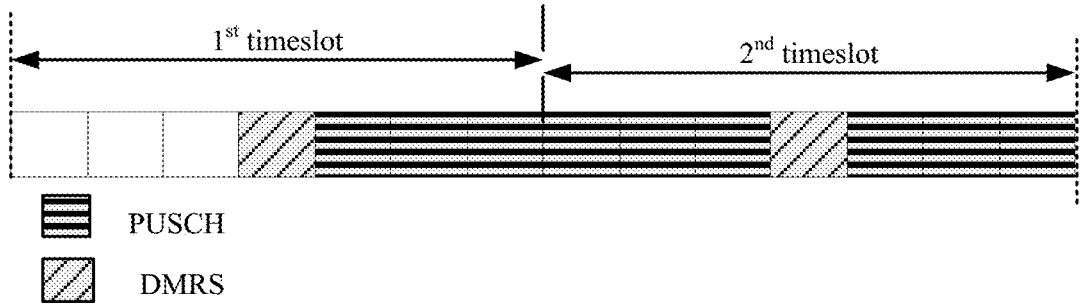
FIG. 6m is a schematic diagram of channel distribution in another uplink subframe according to the first specific embodiment of the present disclosure.

Alternatively, if the access network device needs to reserve a time in the uplink subframe to detect a busy/idle status of a channel in the uplink subframe, and needs to reserve a time in the uplink subframe for another UE to detect a busy/idle status of a channel before the another UE sends an SRS and reserve a time for the another UE to send the SRS, it may be determined that the second symbol set includes the $4^{th}$ symbol to the last symbol of the uplink subframe, namely, the fourth candidate symbol set in the candidate symbol set group. The $4^{th}$ symbol and the last but three symbol of the uplink subframe are used to send a DMRS, the $2^{nd}$ symbol of the uplink subframe is used for CCA detection by the another UE before the another UE sends an SRS, the last symbol of the uplink subframe is used by the another UE to send an SRS, and the $3^{rd}$ symbol of the uplink subframe is used for CCA detection, as shown in FIG. 6m.

Second specific embodiment, channel distribution of a uplink subframe is shown in FIG. 7a, FIG. 7b, FIG. 7c, and FIG. 7d The access network device needs to schedule the UE to send an SRS in the $1^{st}$ symbol of the uplink subframe, and may determine that the first symbol is the $1^{st}$ symbol of the uplink subframe, namely, the first candidate symbol in the first symbol set.

Figure 7A:
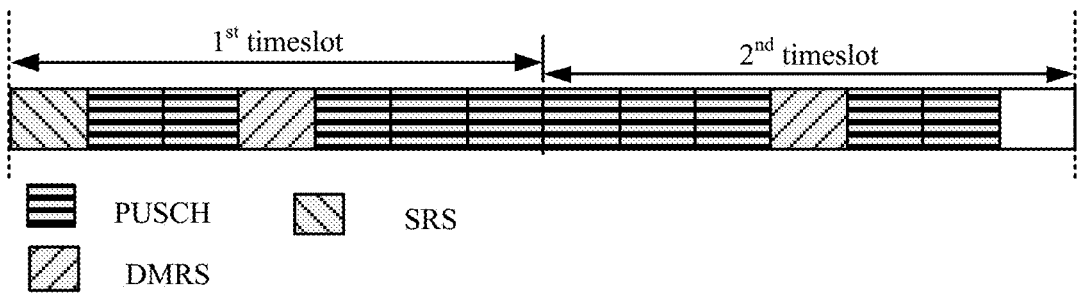
FIG. 7a is a schematic diagram of channel distribution in an uplink subframe according to a second, specific embodiment of the present disclosure.

In addition, if the access network device needs to reserve a time in the uplink subframe to detect a busy/idle status of a channel, it may be determined that the second symbol set includes the $2^{nd}$ symbol to the last but one symbol of the uplink subframe, namely, the sixth candidate symbol set in the candidate symbol set group. The $4^{th}$ symbol and the last but three symbol of the uplink subframe are used to send a DMRS, and the last symbol of the uplink subframe is used for CCA detection, as shown in FIG. 7a.

Figure 7B:
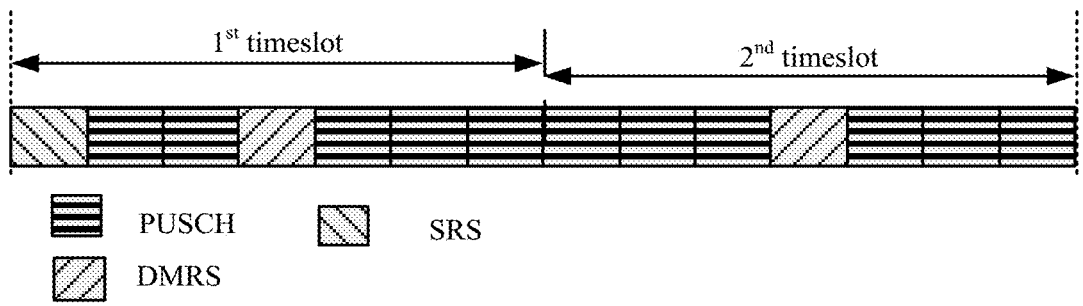
FIG. 7b is a schematic diagram of channel distribution in another uplink subframe according to the second specific embodiment of the present disclosure.

Alternatively, if the access network device does not need to reserve a time in the uplink subframe to detect a busy/idle status of a channel, it may be determined that the second symbol set includes the $2^{nd}$ symbol to the last symbol of the uplink subframe, namely, the ninth candidate symbol set in the candidate symbol set group. The $4^{th}$ symbol and the last but three symbol of the uplink subframe are used to send a DMRS, and there is no need to reserve a location of a symbol in the uplink subframe for CCA detection, as shown in FIG. 7b.

Figure 7C:
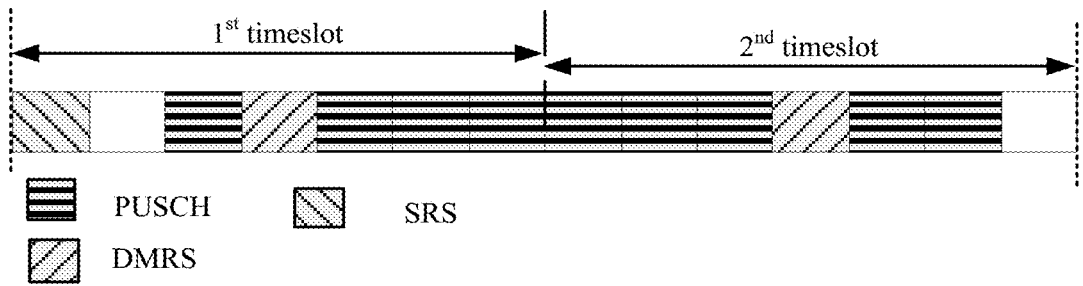
FIG. 7c is a schematic diagram, of channel distribution in another uplink subframe according to the second specific embodiment of the present disclosure.

Alternatively, if the access network device needs to reserve a time in the uplink subframe to detect a busy/idle status of a channel, and needs to reserve a time in the uplink subframe for another UE to detect a busy/idle status of a channel before the another UE sends an SRS, it may be determined that the second symbol set includes the $3^{rd}$ symbol to the last but one symbol of the uplink subframe, namely, the third candidate symbol set in the candidate symbol set group. The $4^{th}$ symbol and the last but three symbol of the uplink subframe are used to send a DMRS, the $2^{nd}$ symbol of the uplink subframe is used for CCA detection by the another UE, and the last symbol of the uplink subframe is used for CCA detection of a next subframe, as shown in FIG. 7c.

Figure 7D:
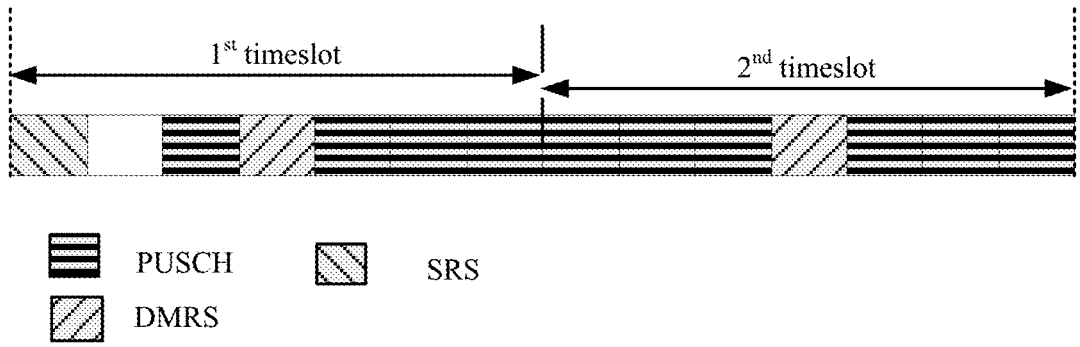
FIG. 7d is a schematic diagram of channel distribution in another uplink subframe according to the second specific embodiment of the present disclosure.

Alternatively, if the access network device needs to reserve a time in the uplink subframe to detect a busy/idle status of a channel, but does not need to reserve a time in the uplink subframe for another UE to detect a busy/idle status of a channel before the another UE sends an SRS, it may be determined that the second symbol set includes the $3^{rd}$ symbol to the last symbol of the uplink subframe, namely, the seventh candidate symbol set in the candidate symbol set group. The $4^{th}$ symbol and the last but three symbol of the uplink subframe are used to send a DMRS, and the $2^{nd}$ symbol of the uplink subframe is used for CCA detection by the another UE, as shown in FIG. 7d.

Third Specific Embodiment

The access network device needs to schedule the UE to send an SRS in the $2^{nd}$ symbol of the uplink subframe, and it may be determined that the first symbol is the $2^{nd}$ symbol of the uplink subframe, namely, the second candidate symbol in the first symbol set.

Figure 8:
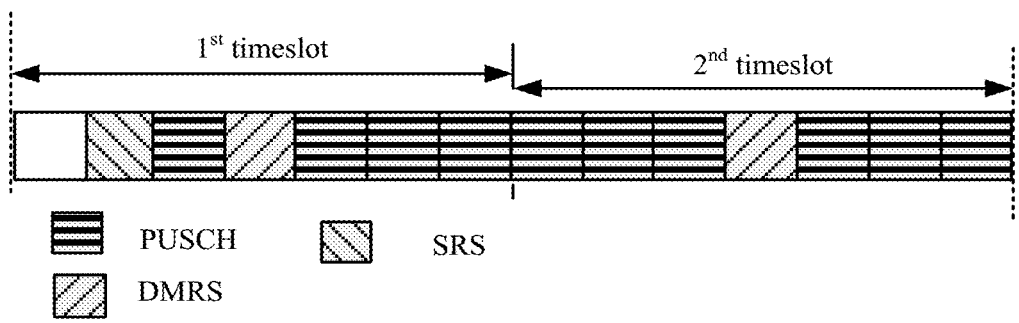
FIG. 8 is a schematic diagram of channel distribution in an uplink subframe according to a third specific embodiment of the present disclosure.

In addition, channel distribution of the uplink subframe is shown in FIG. 8, and if the access network device needs to reserve a time in the uplink subframe for UE that occupies the uplink subframe, to detect a busy/idle status of a channel in the uplink subframe, it may be determined that the second symbol set includes the $3^{rd}$ symbol to the last symbol of the uplink subframe, namely, the seventh candidate symbol set in the candidate symbol set group. The $4^{th}$ symbol and the last but three symbol of the uplink subframe are used to send a DMRS, and the $1^{st}$ symbol of the uplink subframe is used for CCA detection.

Figure 9:
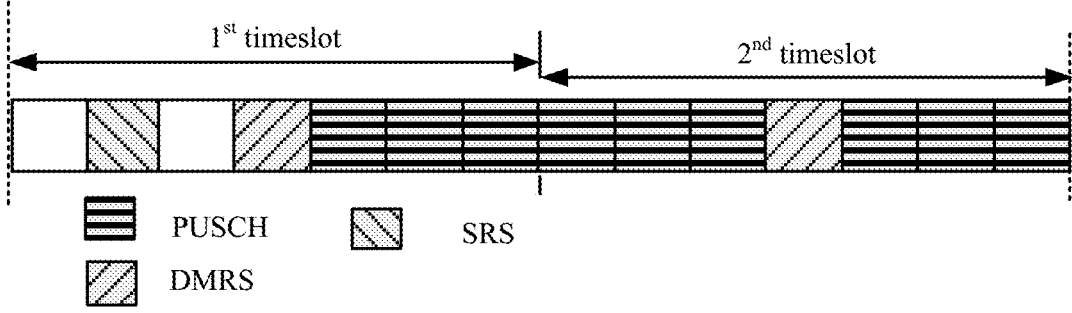
FIG. 9 is a schematic diagram of channel distribution in another uplink subframe according to the third specific embodiment of the present disclosure.

Alternatively, channel distribution of the uplink subframe is shown in FIG. 9, and if the access network device needs to reserve a time in the uplink subframe for UE that occupies the uplink subframe to send an SRS, to detect a busy/idle status of a channel, and needs to reserve a time in the uplink subframe for UE that occupies the uplink subframe to send data, to detect a busy/idle status of a channel, it may be determined that the second symbol set includes the $4^{th}$ symbol to the last symbol of the uplink subframe, namely, the fourth candidate symbol set in the candidate symbol set group. The $4^{th}$ symbol and the last but three symbol of the uplink subframe are used to send a DMRS, the $1^{st}$ symbol of the uplink subframe is used for CCA detection by the UE that sends the SRS, and the $3^{rd}$ symbol of the uplink subframe is used for CCA detection by the UE that sends the data in the uplink subframe.

Fourth specific embodiment, channel distribution of a uplink subframe is shown in FIG. 10a, FIG. 10b, FIG. 10c, and FIG. 10d If the access network device needs to schedule the UE to send an SRS in the last symbol of the uplink subframe, it is determined that the first symbol is the third candidate symbol in the first symbol set, in other words, the first symbol is the last symbol in the $2^{nd}$ timeslot of the uplink subframe.

Figure 10A:
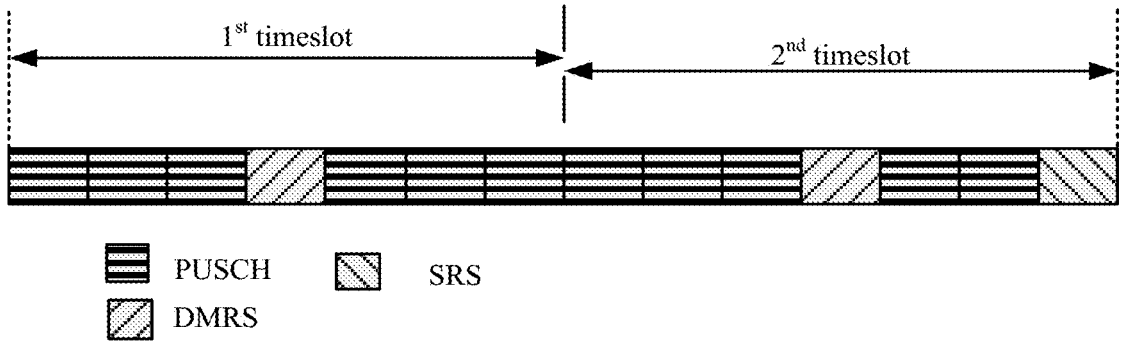
FIG. 10a is a schematic diagram of channel distribution in an uplink subframe according to a fourth specific embodiment of the present disclosure.

In addition, if the access network device does not need to reserve a time in the uplink subframe for UE or another device for CCA detection, and does not need to reserve a time in the uplink subframe for another UE to detect a busy/idle status of a channel before the another UE sends an SRS, it may be determined that the second symbol set is the eighth candidate symbol set in the candidate symbol set group. The eighth candidate symbol set consists of the $1^{st}$ symbol to the last but one symbol of the uplink subframe. The $4^{th}$ symbol and the last but three symbol of the uplink subframe are used to send a DMRS, and there is no need to reserve a location of a symbol in the uplink subframe for CCA detection of a next subframe, as shown in FIG. 10a.

Figure 10B:
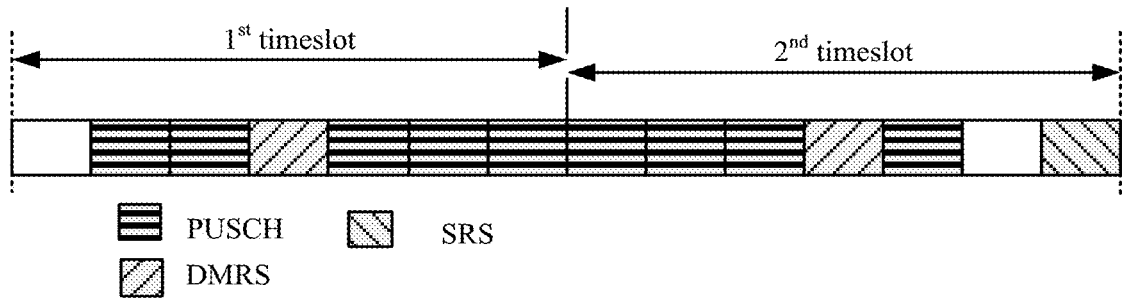
FIG. 10b is a schematic diagram of channel distribution in another uplink subframe according to the fourth specific embodiment of the present disclosure.

Alternatively, if the access network device needs to reserve a time in the uplink subframe for UE that occupies the uplink subframe, to detect a busy/idle status of a channel in the uplink subframe, and needs to reserve a time in the uplink subframe for another UE to detect a busy/idle status of a channel in the uplink subframe before the another UE sends an SRS, it may be determined that the second symbol set is the second candidate symbol set in the candidate symbol set group. The second candidate symbol set consists of the $2^{nd}$ symbol to the last but two symbol of the uplink subframe. The $4^{th}$ symbol and the last but three symbol of the uplink subframe are used to send a DMRS, the $1^{st}$ symbol of the uplink subframe is the time for the UE that occupies the uplink subframe, to detect the busy/idle status of the channel in the uplink subframe, the last but one symbol of the uplink subframe is the time for the another UE that occupies the uplink subframe, to detect the busy/idle status of the channel in the uplink subframe before the another UE sends the SRS, and there is no need to reserve a location of a symbol in the uplink subframe for CCA detection of a next subframe, as shown in FIG. 10b.

Figure 10C:
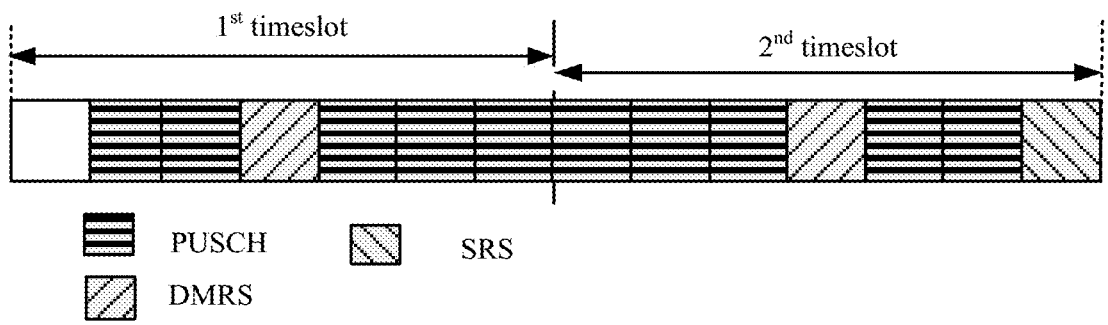
FIG. 10c is a schematic diagram of channel distribution in another uplink subframe according to the fourth specific embodiment of the present disclosure.

Alternatively, if the access network device needs to reserve a time in the uplink subframe for UE that occupies the uplink subframe, to detect a busy/idle status of a channel in the uplink subframe, but does not need to reserve a time in the uplink subframe for another UE to detect a busy/idle status of a channel before the another UE sends an SRS, it may be determined that the second symbol set includes the $2^{nd}$ symbol to the last but one symbol of the uplink subframe, namely, the sixth candidate symbol set in the candidate symbol set group. The $4^{th}$ symbol and the last but three symbol of the uplink subframe are used to send a DMRS, and the $1^{st}$ symbol of the uplink subframe is used for CCA detection, as shown in FIG. 10c.

Figure 10D:
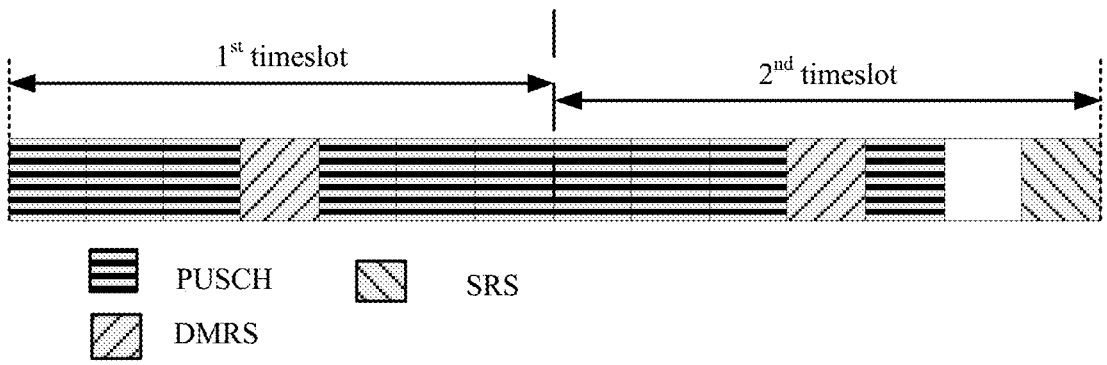
FIG. 10d is a schematic diagram, of channel distribution in another uplink subframe according to the fourth specific embodiment of the present disclosure.

Alternatively, if the access network device does not need to reserve a time in the uplink subframe for UE that occupies the uplink subframe, to detect a busy/idle status of a channel in the uplink subframe, but needs to reserve a time in the uplink subframe for another UE to detect a busy/idle status of a channel in the uplink subframe before the another UE, sends an SRS, it may be determined that the second symbol set includes the $1^{st}$ symbol to the last but two symbol of the uplink subframe, namely, the fifth candidate symbol set in the candidate symbol set group. The $4^{th}$ symbol and the last but three symbol of the uplink subframe are used to send a DMRS, and the $1^{st}$ symbol of the uplink subframe is used for CCA detection, as shown in FIG. 10d.

Figure 11A:
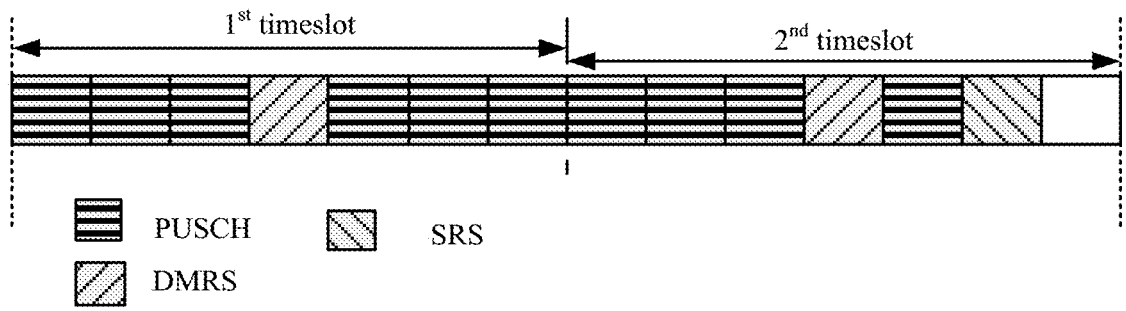
FIG. 11a is a schematic diagram of channel distribution in an uplink subframe according to a fifth specific embodiment of the present disclosure.
Figure 11B:
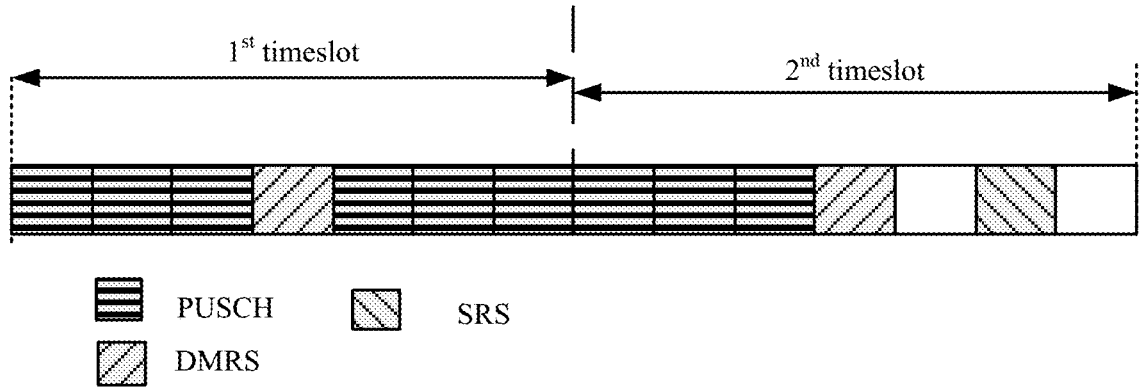
FIG. 11b is a schematic diagram, of channel distribution in another uplink subframe according to the fifth specific embodiment of the present disclosure.

Fifth specific embodiment, channel distribution of a uplink subframe is shown in FIG. 11a and FIG. 11b The access network device needs to schedule the UE to send an SRS in the last but one symbol of the uplink subframe, and reserve the last symbol of the uplink subframe for the UE or another device for CCA detection, and the access network device may determine the first symbol as the fourth candidate symbol in the first symbol set. In other words, the first symbol is the last but one symbol of the uplink subframe.

In addition, if the access network device does not need to reserve a time in the uplink subframe for another UE to detect a busy/idle status of a channel before the another UE sends an SRS, it may be determined that the second symbol set is the fifth candidate symbol set in the candidate symbol set group. The fifth candidate symbol set consists of the $1^{st}$ symbol to the last but two symbol of the uplink subframe. The $4^{th}$ symbol and the last but three symbol of the uplink subframe are used to send a DMRS, as shown in FIG. 11a.

Alternatively, if the access network device needs to reserve a time in the uplink subframe for another UE to detect a busy/idle status of a channel before the another UE sends an SRS, it may be determined that the second symbol set is the first candidate symbol set in the candidate symbol set. The first candidate symbol set consists of the $1^{st}$ symbol to the last but three symbol of the uplink subframe. The $4^{th}$ symbol and the last but three symbol of the uplink subframe are used to send a DMRS, and the last but two symbol of the uplink subframe is used for CCA detection by the another UE, as shown in FIG. 11b.

Based on a same inventive concept, in the embodiments of the present disclosure, a location of the first symbol at which the UE 1 is scheduled by the access network device in the first uplink subframe to send an SRS is affected by whether there is a need to reserve a time in the first uplink subframe for another UE to detect a busy/idle status of a channel before the another UE sends data in the second uplink subframe, and affected by whether there is a need to schedule the another UE to send a PUSCH/an SRS in the first uplink subframe. For UE, the UE cannot learn of configurations and scheduling statuses of the access network device for the another UE, but a location for the UE to send a PUSCH and/or an SRS is affected by the another UE, and a time for each UE and a location occupied by each UE to send data cannot be determined. Therefore, it is very complex for the access network device to centrally manage uplink shared channel resources.

To reduce complexity of the access network device in centrally managing the uplink shared channel resources, the access network device indicates SRS sending statuses of at least two UEs in a same uplink subframe in a common downlink control channel sent to the at least two UEs, centrally schedules SRSs of the UEs as many as possible in a same uplink subframe or a same symbol of a same uplink subframe, and reduces a time reserved for individual UE to detect a busy/idle status of a channel, to reduce complexity in centrally managing the uplink shared channel resources.

Figure 12:
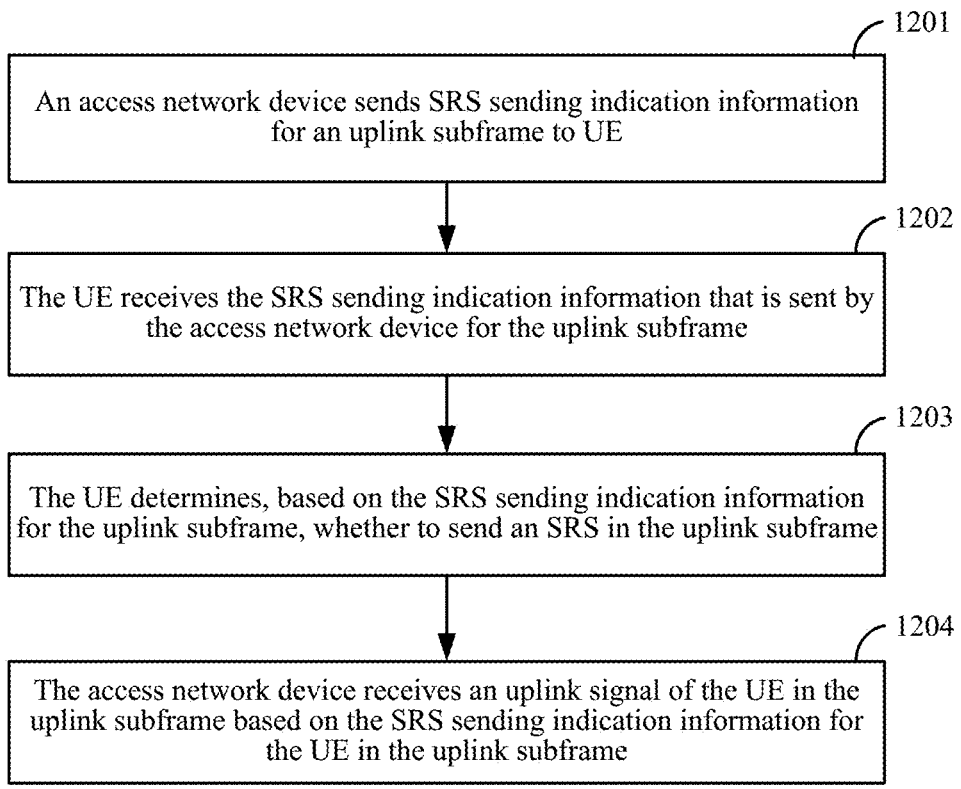
FIG. 12 is a schematic diagram of an SRS transmission process according to an embodiment of the present disclosure.

Based on this, a specific implementation of SRS transmission is shown in FIG. 12, and details are as follows.

Step 1201: An access network device sends SRS sending indication information for an uplink subframe to UE.

The SRS sending indication information includes information about whether to send an SRS in the uplink subframe, and/or information about whether to send an SRS in a first symbol of the uplink subframe.

Step 1202: The UE receives the SRS sending indication information that is sent by the access network device for the uplink subframe.

Step 1203: The UE determines, based on the SRS sending indication information for the uplink subframe, whether to send an SRS in the uplink subframe.

Specifically, based on the SRS sending indication information for the uplink subframe, the UE does not send an SRS in the uplink subframe, or sends an SRS in the first symbol of the uplink subframe.

Step 1204: The access network device receives an uplink signal of the UE in the uplink subframe based on the SRS sending indication information for the UE in the uplink subframe.

Specifically, if the SRS sending indication information for the uplink subframe instructs to send an SRS in the first symbol of the uplink subframe, the access network device receives the SRS in the first symbol of the uplink subframe; otherwise, the access network device receives no SRS in the uplink subframe.

Specifically, the first symbol is any candidate symbol included in a first symbol set, and the first symbol set includes at least one of the following candidate symbols:

a first candidate symbol being the $1^{st}$ symbol of the uplink subframe;

a second candidate symbol being the $2^{nd}$ symbol of the uplink subframe;

a third candidate symbol being the last symbol of the uplink subframe;

a fourth candidate symbol being the last but one symbol of the uplink subframe;

a fifth candidate symbol being a symbol corresponding to a DMRS in the $1^{st}$ timeslot of the uplink subframe;

a sixth candidate symbol being a symbol corresponding to a DMRS in the $2^{nd}$ timeslot of the uplink subframe; and a seventh candidate symbol being the last symbol in the $1^{st}$ timeslot of the uplink subframe.

Specifically, the SRS sending indication information for the uplink subframe belongs to information on a common downlink control channel that is sent by the access network device to at least two UEs.

The common downlink control channel is any one of the following:

a physical downlink control channel sent in common search space of the physical downlink control channel;

an enhanced physical downlink control channel sent in common search space of the enhanced physical downlink control channel;

a common downlink control channel sent in a resource of a hybrid automatic retransmission indicator physical channel; and a common downlink control channel sent in a resource of a physical control format indicator channel.

Specifically, the SRS sending indication information for the uplink subframe on the common downlink control channel uses first RNTI (radio network temporary identity)-scrambled CRC check code. The first RNTI is configured by the access network device for the UE, and is used to demodulate SRS sending indication information for the UE in an uplink subframe of an uplink carrier.

The first RNTI is configured by the access network device for the at least two UEs.

The common downlink control channel includes SRS sending indication information for the at least two UEs in the uplink subframe of the uplink carrier.

Optionally, the SRS sending indication information for the at least two UEs in the uplink subframe of the uplink carrier is the same. On the common downlink control channel, the SRS sending indication information in the uplink subframe of the uplink carrier is the SRS sending indication information shared by the at least two UEs.

Optionally, the SRS sending indication information for the at least two UEs in the uplink subframe of the uplink carrier is different. The access network device configures a location of SRS sending indication information that is of each of the at least two UEs and that is for the uplink subframe of the uplink carrier, on the common downlink control channel. Each of the at least two UEs obtains, based on the indicated location information, the SRS sending indication information for the UE in the uplink subframe on the common downlink control channel.

For example, the SRS sending indication information sent by the access network device on the common downlink control channel is: SRS sending indication information 1, SRS sending indication information 2, SRS sending indication information 3, . . . , and SRS sending indication information L, The SRS sending indication information 1, the SRS sending indication information 2, the SRS sending indication information 3, and the SRS sending indication information L are SRS sending indication information for L UEs. After determining information that is received on the common downlink control channel by using the first RNTI, any one of the L UEs obtains SRS sending indication information for the UE in the uplink subframe based on a location, of the SRS sending indication information that is configured by the access network device for the UE, on the common downlink control channel.

Optionally, when the SRS sending indication information for the at least two UEs is to send an SRS in first symbols of the uplink subframe, the first symbols corresponding to the at least two UEs may be the same or may be different.

Optionally, the common downlink control channel may alternatively be sent on a resource of a hybrid automatic retransmission indicator physical channel or a resource of a physical control format indicator channel. On carriers in an unlicensed spectrum, HARQ-ACK information does not need to be sent on a resource of a hybrid automatic retransmission indicator physical channel, and control format indication information does not need to be sent on a resource of a physical control format indicator channel. Therefore, a common downlink control channel may be sent on the resource of the hybrid automatic retransmission indicator physical channel or the resource of the physical control format indicator channel on the carriers in the unlicensed spectrum.

Figure 13:
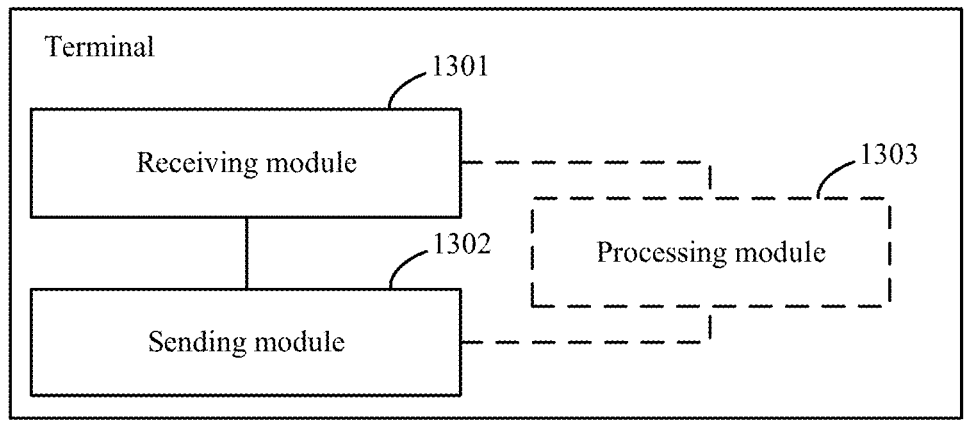
FIG. 13 is a schematic structural diagram of a terminal according to an embodiment of the present disclosure.

Based on a same inventive concept, an embodiment of the present disclosure further provides a terminal. For a specific implementation of the terminal, refer to the description of the foregoing method, embodiment part, and a repeated part is not described again. As shown in FIG. 13, the terminal mainly includes:

a receiving module 1301, configured to receive signal sending indication information that is sent by an access network device for an uplink subframe, where the signal sending indication information is used to instruct the terminal UE to send a sounding reference signal SRS in a first symbol of the uplink subframe, and/or used to instruct the UE to send a PUSCH in a symbol that is included in a second symbol set of the uplink subframe; and a sending module 1302, configured to send an SRS and/or a PUSCH in the uplink subframe based on the signal sending indication information.

In a possible implementation, the first symbol and/or the symbol that is included in the second symbol set are/is sent to the UE by the access network device by using the signal sending indication information; or the first symbol and/or the symbol that is included in the second symbol set are/is preconfigured for the UE by the access network device.

In a possible implementation, the terminal further includes a processing module 1303, configured to:

determine first configuration information, where the first configuration information includes indication information of a first symbol set and/or a candidate symbol set group;

determine the first symbol in the first symbol set based on the signal sending indication information; and/or determine the second symbol set in the candidate symbol set group based on the signal sending indication information.

In a possible implementation, the receiving module is further configured to receive the first configuration information sent by the access network device; or the processing module is further configured to: determine a type of the uplink subframe based on the signal sending indication information, and determine the first configuration information corresponding to the type of the uplink subframe based on a preset correspondence between the type of the uplink subframe and the first configuration information.

For a specific configuration of the first symbol set and the candidate symbol set group, refer to the description of the method embodiment part, and details are not repeatedly described herein. For a specific configuration of the first symbol and the symbol that is included in the second symbol set, refer to the description of the method embodiment part, and details are not repeatedly described herein.

Figure 14:
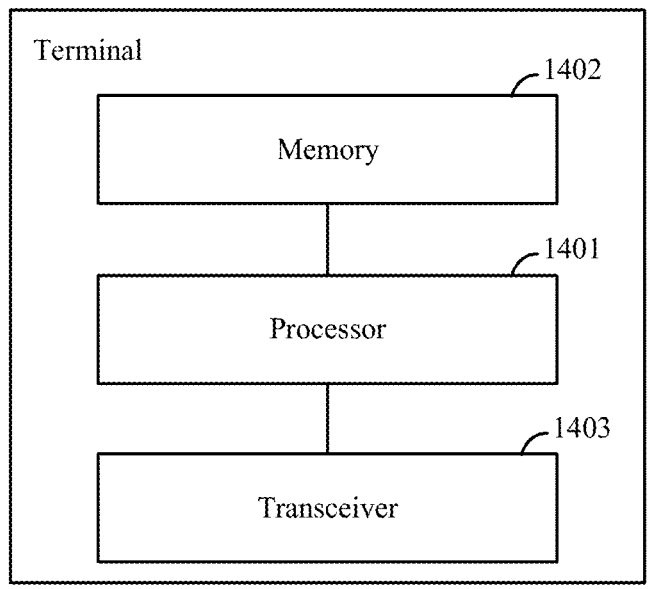
FIG. 14 is a schematic structural diagram, of another terminal according to an embodiment of the present disclosure.

Based on a same inventive concept, an embodiment of the present disclosure further provides another terminal. For a specific implementation of the terminal, refer to the description of the foregoing method embodiment part, and a repeated part is not described again. As shown in FIG. 14, the terminal mainly includes a processor 1401, a memory 1402, and a transceiver 1403, The transceiver 1403 is configured to send and receive data under control of the processor 1401, the memory 1402 stores a preset program, and the processor 1401 reads the program, stored in the memory 1402 to perform the following process according to the program:

receiving, by using the transceiver 1403, signal sending indication information that is sent by an access network device for an uplink subframe, where the signal sending indication information is used to instruct the terminal UE to send a sounding reference signal SRS in a first symbol of the uplink subframe, and/or used to instruct the UE to send a PUSCH in a symbol that is included in a second symbol set of the uplink subframe; and instructing, based on the signal sending indication information, the transceiver 1403 to send an SRS and/or a PUSCH in the uplink subframe.

In all possible implementations, the first symbol and/or the symbol that is included in the second symbol set are/is sent to the UE by the access network device by using the signal sending indication information; or the first symbol and/or the symbol that is included in the second symbol set are/is preconfigured for the UE by the access network device.

In a possible implementation, the processor 1401 determines first configuration information, where the first configuration information includes indication information of a first symbol set and/or a candidate symbol set group; determines the first symbol in the first symbol set based on the signal sending indication information, and/or determines the second symbol set in the candidate symbol set group based on the signal sending indication information.

In a possible implementation, the processor 1401 is further configured to receive, by using the transceiver 1403, the first configuration information sent by the access network device; or the processor 1401 is further configured to: determine a type of the uplink subframe based on the signal sending indication information, and determine the first configuration information corresponding to the type of the uplink subframe based on a preset correspondence between the type of the uplink subframe and the first configuration information.

For a specific configuration of the first symbol set and the candidate symbol set group, refer to the description of the method embodiment part, and details are not repeatedly described herein. For a specific configuration of the first symbol and the symbol that is included in the second symbol set, refer to the description of the method embodiment part, and details are not repeatedly described herein.

Figure 15:
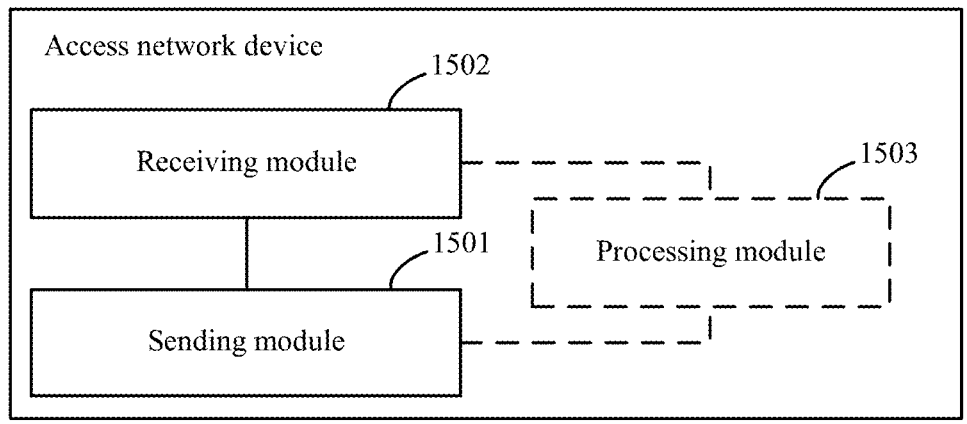
FIG. 15 is a schematic structural diagram of a network side device according to an embodiment of the present disclosure.

Based on a same inventive concept, an embodiment of the present disclosure further provides an access network device. For a specific implementation of the access network device, refer to the description of the foregoing method embodiment part, and a repeated part is not described again. As shown in FIG. 15, the access network device mainly includes:

a sending module 1501, configured to send signal sending indication information for an uplink subframe, where the signal sending indication information is used to instruct a terminal UE to send a sounding reference signal SRS in a first symbol of the uplink subframe, and/or used to instruct the terminal UE to send a PUSCH in a symbol that is included in a second symbol set of the uplink sub frame; and a receiving module 1502, configured to receive an SRS and/or a PUSCH that are/is sent by the UE in the uplink subframe based on the signal sending indication information.

In a possible implementation, the access network device further includes a processing module 1503, specifically configured to:

notify, by using the signal sending indication information, the UE of the first symbol and/or the symbol that is included in the second symbol set; or preconfigure the first symbol and/or the symbol that is included in the second symbol set for the UE.

In a possible implementation, the sending module 1501 is further configured to:

send first configuration information to the UE, where the first configuration information includes indication information of a first symbol set and/or a candidate symbol set group, the first symbol set includes at least one candidate symbol of the first symbol, and the candidate symbol set group includes at least one candidate symbol set of the second symbol set.

For a specific configuration of the first symbol set and the candidate symbol set group, refer to the description of the method embodiment part, and details are not repeatedly described herein. For a specific configuration of the first symbol and the symbol that is included in the second symbol set, refer to the description of the method embodiment part, and details are not repeatedly described herein.

Figure 16:
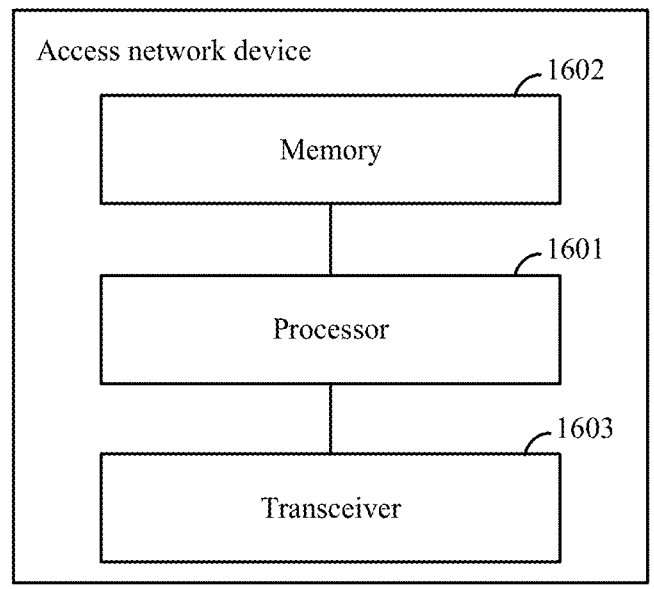
FIG. 16 is a schematic structural diagram of another network side device according to an embodiment of the present disclosure.

Based on a same inventive concept, an embodiment of the present disclosure further provides an access network device. For a specific implementation of the access network device, refer to the description of the foregoing method embodiment part, and a repeated part is not described again. As shown in FIG. 16, the access network device mainly includes a processor 1601, a memory 1602, and a transceiver 1603. The transceiver 1603 is configured to send and receive data under control of the processor 1601, the memory 1602 stores a preset program, and the processor 1601 reads the program, stored in the memory 1602 to perform the following process according to the program:

instructing the transceiver 1603 to send signal sending indication information for an uplink subframe, where the signal sending indication information is used to instruct a terminal UE to send a sounding reference signal SRS in a first symbol of the uplink subframe, and/or used, to instruct the terminal UE to send a PUSCH in a symbol that is included in a second symbol set of the uplink subframe; and receiving, by using the transceiver 1603, an SRS and/or a PUSCH that are/is sent by the UE in the uplink subframe based on the signal sending indication information.

In a possible implementation, the processor 1601 notifies, by using the signal sending indication information, the UE of the first symbol and/or the symbol that is included in the second symbol set, or preconfigures the first symbol and/or the symbol that is included in the second symbol set for the UE.

In a possible implementation, the processor 1601 is further configured to instruct the transceiver 1603 to send first configuration information to the UE, where the first configuration information includes indication information of a first symbol set and/or a candidate symbol set group, the first symbol set includes at least one candidate symbol of the first symbol, and the candidate symbol set group includes at least one candidate symbol set of the second symbol set.

For a specific configuration of the first symbol set and the candidate symbol set group, refer to the description of the method embodiment part, and details are not repeatedly described herein. For a specific configuration of the first symbol and the symbol that is included in the second symbol set, refer to the description of the method embodiment part, and details are not repeatedly described herein.

Figure 17:
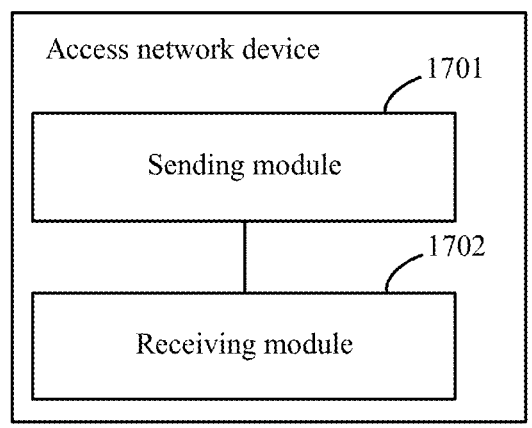
FIG. 17 is a schematic structural diagram of another network side device according to an embodiment of the present disclosure.

Based on a same inventive concept, an embodiment of the present disclosure further provides another access network device. For a specific implementation of the access network device, refer to the description of the foregoing method embodiments, and a repeated part is not described again. As shown in FIG. 17, the access network device mainly includes:

a sending module 1701, configured to send SRS sending indication information for an uplink subframe to UE; and a receiving module 1702, configured to receive an uplink signal of the UE in the uplink subframe based on the SRS sending indication information.

The SRS sending indication information includes information about whether to send an SRS in the uplink subframe, and/or information about whether to send an SRS in a first symbol of the uplink subframe.

Specifically, if the SRS sending indication information for the uplink subframe instructs to send an SRS in the first symbol of the uplink subframe, the receiving module 1702 receives the SRS in the first symbol of the uplink subframe; otherwise, the receiving module 1702 receives no SRS in the uplink subframe.

Specifically, the SRS sending indication information for the uplink subframe belongs to information on a common downlink control channel that is sent by the access network device to at least two UEs.

Specifically, for a specific configuration of the first symbol, refer to the description of the foregoing method embodiments, and details are not repeatedly described herein.

Figure 18:
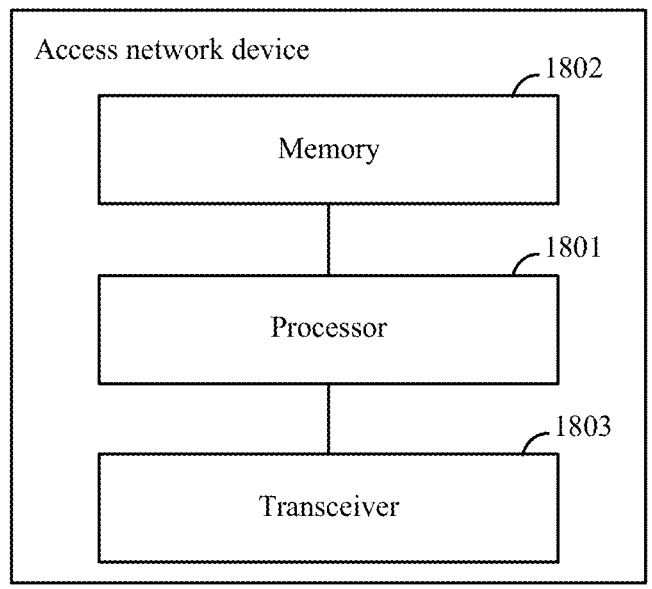
FIG. 18 is a schematic structural diagram of another network side device according to an embodiment of the present disclosure.

Based on a same inventive concept, an embodiment of the present disclosure further provides another access network device. For a specific implementation of the access network device, refer to the description of the foregoing method embodiments, and a repeated part is not described again. As shown in FIG. 18, the access network device mainly includes a processor 1801, a memory 1802, and a transceiver 1803. The transceiver 1803 is configured to send and receive data under control of the processor 1801, the memory 1802 stores a preset program, and the processor 1801 reads the program stored in the memory 1802 to perform, the following process according to the program:

instructing the transceiver 1803 to send SRS sending indication information for an uplink subframe to UE; and instructing, based on the SRS sending indication information, the transceiver 1803 to receive an uplink signal of the UE in the uplink subframe.

The SRS sending indication information includes information about whether to send an SRS in the uplink subframe, and/or information about whether to send an SRS in a first symbol of the uplink subframe.

Specifically, if the SRS sending indication information for the uplink subframe instructs to send an SRS in the first symbol of the uplink subframe, the processor instructs the transceiver to receive the SRS in the first symbol of the uplink subframe; otherwise, the processor instructs the transceiver to receive no SRS in the uplink subframe.

Specifically, the SRS sending indication information for the uplink subframe belongs to information on a common downlink control channel that is sent by the access network device to at least two UEs.

Specifically, for a specific configuration of the first symbol, refer to the description of the foregoing method embodiments, and details are not repeatedly described herein.

Figure 19:
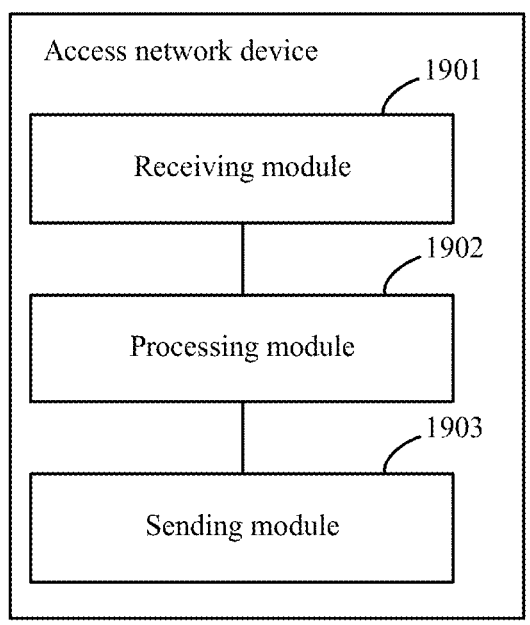
FIG. 19 is a schematic structural diagram, of another terminal according to an embodiment of the present disclosure.

Based on a same inventive concept, an embodiment of the present disclosure further provides another terminal. For a specific implementation of the terminal, refer to the description of the foregoing method embodiments, and a repeated part is not described again. As shown in FIG. 19, the terminal mainly includes:

a receiving module 1901, configured to receive SRS sending indication information that is sent by an access network device for an uplink subframe; and a processing module 1902, configured to determine, based on the SRS sending indication information for the uplink subframe, whether to instruct a sending module 1903 to send an SRS in the uplink subframe.

The SRS sending indication information includes information about whether to send an SRS in the uplink subframe, and/or information about whether to send an SRS in a first symbol of the uplink subframe.

Specifically, for a specific configuration of the first symbol, refer to the description of the foregoing method embodiments, and details are not repeatedly described herein.

Figure 20:
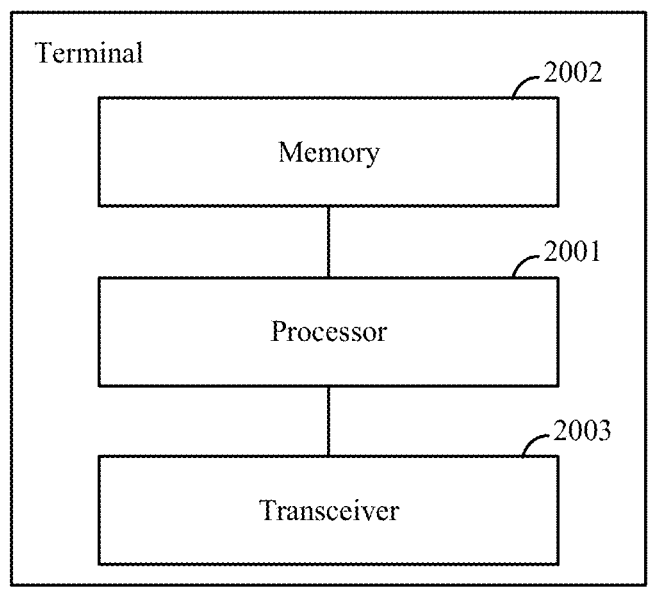
FIG. 20 is a schematic structural diagram of smother terminal according to an embodiment of the present disclosure.

Based on a same inventive concept, an embodiment of the present disclosure further provides another terminal. For a specific implementation of the terminal, refer to the description of the foregoing method embodiments, and a repeated part is not described again. As shown in FIG. 20, the terminal mainly includes a processor 2001, a memory 2002, and a transceiver 2003. The transceiver 2003 is configured to send and receive data under control of the processor 2001, the memory 2002 stores a preset program, and the processor 2001 reads the program stored in the memory 2002 to perform the following process according to the program:

receiving, by using the transceiver 2003, SRS sending indication information that is sent by an access network device for an uplink subframe; and determining, based, on the SRS sending indication information for the uplink subframe, whether to instruct the transceiver 2003 to send an SRS in the uplink subframe.

The SRS sending indication information, includes information about whether to send an SRS in the uplink subframe, and/or information about whether to send an SRS in a first symbol of the uplink subframe.

Specifically, for a specific configuration of the first symbol, refer to the description of the foregoing method embodiments, and details are not repeatedly described herein.

Bus architectures in FIG. 14, FIG. 16, FIG. 18, and FIG. 20 may include any quantity of interconnected buses and bridges. Specifically, the interconnected buses and bridges are linked together by one or more processors represented, by a processor and various circuits of memories represented by a memory. By using the bus architectures, various other circuits such as peripheral devices, voltage regulators, and power management circuits can be linked together. This is well known in the art and therefore is no longer further described in this specification. A bus interface provides an interface. A transceiver may be a plurality of elements, that is, include a transmitter and a transceiver, and provide units that communicate with other apparatuses in a transmission medium. The processor is responsible for bus architecture management and general processing, and the memory may store data used when the processor performs an operation.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory and an optical memory) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or the any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method, comprising:
    receiving, by a terminal, a physical control channel from an access network device, wherein the physical control channel comprises signal sending indication information indicating whether a symbol set for a physical uplink shared channel (PUSCH) in an uplink subframe includes a last symbol of the uplink subframe and whether the symbol set for the PUSCH includes a first symbol of the uplink subframe;
    determining, by the terminal, the symbol set for the PUSCH according to the signal sending indication information; and
    sending, by the terminal, the PUSCH on the symbol set in the uplink subframe;
    wherein the symbol set is one of candidate symbol sets comprised in a candidate symbol set group, the candidate symbol set group comprises the following candidate symbol sets:
    the $2^{nd}$ symbol to the last but one symbol of the uplink subframe;
    the $1^{st}$ symbol to the last but one symbol of the uplink subframe;
    the $2^{nd}$ symbol to the last symbol of the uplink subframe; and
    all symbols of the uplink subframe.

2. The method according to claim 1, wherein the physical control channel is a physical downlink control channel (PDCCH) or an enhanced physical downlink control channel (EPDCCH).

3. The method according to claim 1, wherein each candidate symbol set in the candidate symbol set group comprises 14, 13, 12, or 11 consecutive symbols.

4. An apparatus, comprising:
    a processor; and
    a storage medium comprising executable instructions that, when executed by the processor, cause the apparatus to:
    receive a physical control channel from an access network device, wherein the physical control channel comprises signal sending indication information indicating whether a symbol set for a physical uplink shared channel (PUSCH) in an uplink subframe includes a last symbol of the uplink subframe and whether the symbol set for the PUSCH includes a first symbol of the uplink subframe;
    determine the symbol set for the PUSCH according to the signal sending indication information; and
    send the PUSCH on the symbol set in the uplink subframe;
    wherein the symbol set is one of candidate symbol sets comprised in a candidate symbol set group, the candidate symbol set group comprises the following candidate symbol sets:
    the $2^{nd}$ symbol to the last but one symbol of the uplink subframe;
    the $1^{st}$ symbol to the last but one symbol of the uplink subframe;
    the $2^{nd}$ symbol to the last symbol of the uplink subframe; and
    all symbols of the uplink subframe.

5. The apparatus according to claim 4, wherein the physical control channel is a physical downlink control channel (PDCCH) or an enhanced physical downlink control channel (EPDCCH).

6. The apparatus according to claim 4, wherein each candidate symbol set in the candidate symbol set group comprises 14, 13, 12, or 11 consecutive symbols.

7. A non-transitory computer readable storage medium, comprising computer program codes which when executed by a computer processor cause the computer processor to:
    receive a physical control channel from an access network device, wherein the physical control channel comprises signal sending indication information indicating whether a symbol set for a physical uplink shared channel (PUSCH) in an uplink subframe includes a last symbol of the uplink subframe and whether the symbol set for the PUSCH includes a first symbol of the uplink subframe;

determine the symbol set for the PUSCH according to the signal sending indication information; and send the PUSCH on the symbol set in the uplink subframe;

wherein the symbol set is one of candidate symbol sets comprised in a candidate symbol set group, the candidate symbol set group comprises the following candidate symbol sets:

the $2^{nd}$ symbol to the last but one symbol of the uplink subframe;

the $1^{st}$ symbol to the last but one symbol of the uplink subframe;

the $2^{nd}$ symbol to the last symbol of the uplink subframe; and all symbols of the uplink subframe.

8. The non-transitory computer readable storage medium according to claim 7, wherein the physical control channel is a physical downlink control channel (PDCCH) or an enhanced physical downlink control channel (EPDCCH).

9. The non-transitory computer readable storage medium according to claim 7, wherein every candidate symbol set in the candidate symbol set group comprises 14, 13, 12, or 11 consecutive symbols.

* * * * *